US007401077B2

(12) United States Patent
Bobrow et al.

(10) Patent No.: US 7,401,077 B2
(45) Date of Patent: Jul. 15, 2008

(54) SYSTEMS AND METHODS FOR USING AND CONSTRUCTING USER-INTEREST SENSITIVE INDICATORS OF SEARCH RESULTS

(75) Inventors: Daniel G. Bobrow, Palo Alto, CA (US); Ronald M. Kaplan, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 310 days.

(21) Appl. No.: 11/017,890

(22) Filed: Dec. 21, 2004

(65) Prior Publication Data

US 2006/0136385 A1 Jun. 22, 2006

(51) Int. Cl.
*G06F 17/30* (2006.01)
*G06F 7/00* (2006.01)

(52) U.S. Cl. .............................. 707/5; 707/102; 707/6; 707/101

(58) Field of Classification Search ..................... 707/5, 707/102, 6, 101
See application file for complete search history.

(56) References Cited

U.S. PATENT DOCUMENTS

| | | | |
|---|---|---|---|
| 5,438,511 A | | 8/1995 | Maxwell et al. |
| 5,689,716 A | | 11/1997 | Chen |
| 2003/0212648 A1 | * | 11/2003 | Cunningham et al. .......... 707/1 |
| 2004/0230415 A1 | | 11/2004 | Riezler et al. |
| 2005/0071741 A1 | * | 3/2005 | Acharya et al. ............. 715/500 |
| 2005/0108001 A1 | * | 5/2005 | Aarskog ...................... 704/10 |
| 2006/0031043 A1 | * | 2/2006 | Oral et al. ................... 702/187 |

OTHER PUBLICATIONS

U.S. Appl. No. 10/999,792, Kaplan et al.
U.S. Appl. No. 10/999,793, Kaplan et al.
U.S. Appl. No. 11/017,890, Bobrow et al.
S. Riezler et al., "Statistical Sentence Condensation Using Packing and Stochastic Disambiguation Methods for Lexical-Functional Grammar", in Proceedings of HLT-NAACL 2003, Main Papers, pp. 118-125, Edmonton, May-Jun. 2003.
R. Mitkov, "Introduction to the Special Issue on Computational Anaphora Resolution", in Computational Linguistics vol. 27, Issue 4 (Dec. 2001), pp. 473-477.
A. Frank, "From Parallel Grammar Development towards Machine Translation—A Project Overview-", In Proceedings of the MT Summit VII: MT in the Great Translation Era, 134-142, 1999.
R. Kaplan et al., "Lexical Functional Grammar: A Formal System for Grammatical Representation", in Formal Issues in Lexical-Functional Grammar ed. by M. Dalrymple, R. Kaplan, J. Maxwell and A. Zaenen, 1995.
J. Maxwell III et al., "A Method for Disjunctive Constraint Satisfaction", in Current Issues in Parsing Technology, ed. Masaru Tomita, Kluwer Academic Publishers, 1991, pp. 173-190.

(Continued)

*Primary Examiner*—Kuen S Lu
(74) *Attorney, Agent, or Firm*—Fay Sharpe LLP

(57) ABSTRACT

Techniques are provided to construct and use user-interest sensitive indicators of search results. A set of documents is determined based on one or more search terms. Passages within each selected document are identified based on the search terms. Condensation transformations applied to the passages to preferentially retain elements of the passage based on the search terms and user interest information. The resultant indicator is provides a user-interest sensitive signal of the meaning of the passage.

30 Claims, 18 Drawing Sheets

OTHER PUBLICATIONS

U. Hahn, Automatic Text Summarization Methods, Systems, Evaluation, Text Knowledge Engineering Lab, Freiburg University, Germany, downloaded from www.coling.uni-freiburg.de/leaching/ studies/jena/ss04/introduction.ppt.

Paul and Carol Kiparsky, re-printed from "Progress in Linguistics", eds. M. Bierwisch and K. Heidolph, The Hague: Mouton, 1970.

R. Kaplan, "Three Seductions of Conceptual Psycholinguistics", in Peter Whitelock, Mary McGee Wood, Harold L. Somers, Rod Johnson, Paul Bennet (eds.), Linguistic Theory and Computer Applications p. 149-188 London Academic Press 1987.

European Patent Office Search Report.

Hongyan J., "Sentence reduction for automatic text summarization", In Proc. of the 6th Conf. on Applied NLP, Apr. 29, 2000, pp. 310-315, Seattle, WA.

Kaplan R. et al., "A note-taking appliance for intelligence analysis", May 2, 2005, 2005 International Conference on Intelligence Analysis, McLean, VA, URL: https://analysis.mitre.org/proceedings/Final_Papers_Files/156_Camera_Ready_Paper.pdf, retrieved on or about Jun. 22, 2006.

Crouch R., et al., "Exploiting F-Structure input for sentence condensation" In Proc. of the LFG04 Conference, Jul. 10, 2004, pp. 167-187, Christchurch, NZ.

Knight, K. et al., "Summarization beyond sentence extraction: A probabalistic approach to sentence compression", Artificial Intelligence, vol. 139, 2002, pp. 91-107.

* cited by examiner

Accompanied by an armed guard, Igor Domaradsky carried a dish with a culture of genetically altered plague through the gates of the ancient fortress like a rare jewel.

*FIG. 8*

| { + {Igor Domaradsky \| Igor} |
| + {disease*2} |
| + {bio-weapons*} } |

| |
|---|
| {+{fortress*3} |
| +{archaeology*} |
| +{bronze age*} |
| +{c:\user\abc\file_history} |
| +{c:\user\abc\file_project1} |
| -{container*2} |
| +{Named_Entity.Person*} |

*FIG. 13*

| PATTERN | ACTION |
|---|---|
| -DOWNWARD_MONOTONIC(P) | CONDENSE_MODIFIERS(P) |
| PASSIVE(P), SUBJ(P,S), BY-OBJ(P,O) | SUBJ(P,O), OBJ(P,S) |
| FACTIVE(P,C) | EXTRACT-COMPLEMENT(P,C) |
| POLARITY-PRESERVE(P,C) | EXTRACT-COMPLEMENT(P,C) |
| . | . |
| . | . |
| . | . |
| POLARITY-REVERSE(P,C) | EXTRACT-COMPLEMENT(P,C) NEGATE(C) |

*FIG. 14*

| A001 | For 20 years, Domaradsky was heavily involved in the program, and he's written a book about it called "BioWarrior." He realized he had the most success with the plague. |
| . | . |
| . | . |
| N | An anthropologist and freelance science journalist, Wendy Orent was researching the Soviet bioweapons program several years ago when she came across a monograph by Igor Domaradsky, a biologist who for a period of 23 years had played a major role in studying plague. |

| For 20 years, Domaradsky was heavily involved in the... success with the plague. | . | . | ...years ago when she came across a monograph by Igor Domaradsky, a biologist who for a period of 23 years had played a major role in studying plague. |

| | |
|---|---|
| A001 | Domaradsky had success with the plague. |
| . | . |
| . | . |
| N | Wendy Orent was researching the Soviet bioweapons program when she came across a monograph by Igor Domaradsky, a biologist who studied plague. |

SYSTEMS AND METHODS FOR USING AND CONSTRUCTING USER-INTEREST SENSITIVE INDICATORS OF SEARCH RESULTS

INCORPORATION BY REFERENCE

The following co-pending application:

"Systems and Methods for User-Interest Sensitive Note-Taking" by R. KAPLAN et al., filed Nov. 30, 2004, as U.S. application Ser. No. 10/999,793, and published as U.S. Publication No. 2006/0116861A1 on June 1, 2006; and "Systems and Methods for User-Interest Sensitive Condensation" by R. KAPLAN et al., filed Nov. 30, 2004, as U.S. application Ser. No. 10/999,792, and published as U.S. Publication No. 2006/0116860A1 on June 1,2006;

"Systems and Methods for Grammatical Text Condensation" by S. Riezler et al., filed May 12, 2003 as U.S. patent application Ser. No. 10/435,036, and published as U.S. Publication No. 2004/0230415A1 on Nov. 18, 2004;

U.S. Pat. No. 5,438,511 entitled, "Disjunctive Unification" by J. T. Maxwell, Ill et al., filed Oct. 19, 1988; each incorporated herein by reference, in its entirety.

BACKGROUND OF THE INVENTION

1. Field of Invention

This invention relates to condensing text and other content to signal the meaning of search results.

2. Description of Related Art

Search systems typically return links to sets of document relevant to the search query terms. The documents are ranked based on a measure of relevance. Some search systems help users select documents relevant to their needs by presenting relevant portions of the document. Many of these conventional search systems merely extract and display portions of the document surrounding the search terms. The extracted portions surrounding the search terms are ungrammatical and difficult to read. Moreover, the extracted portions may not reflect user interest.

Thus systems and methods that construct user-interest sensitive indicators of search results that signal the meaning of a passage and that are easy to read would be useful.

SUMMARY OF THE INVENTION

The systems and methods according to this invention determine the results of a search. Relevant passages are selected for each document based on the search terms. User interest information describing the concepts of interest to the user is determined. User-interest sensitive condensates for each document are determined by applying condensation transformations to the document passages based on the user interest information. The user-interest sensitive condensates associated with each document in the search result are then combined with selectable links operable to display all or portions of the document passage. The resultant user-interest sensitive indicator of search results provides a user-interest sensitive signal of the passage in a format having low cognitive overhead.

Figure 2:
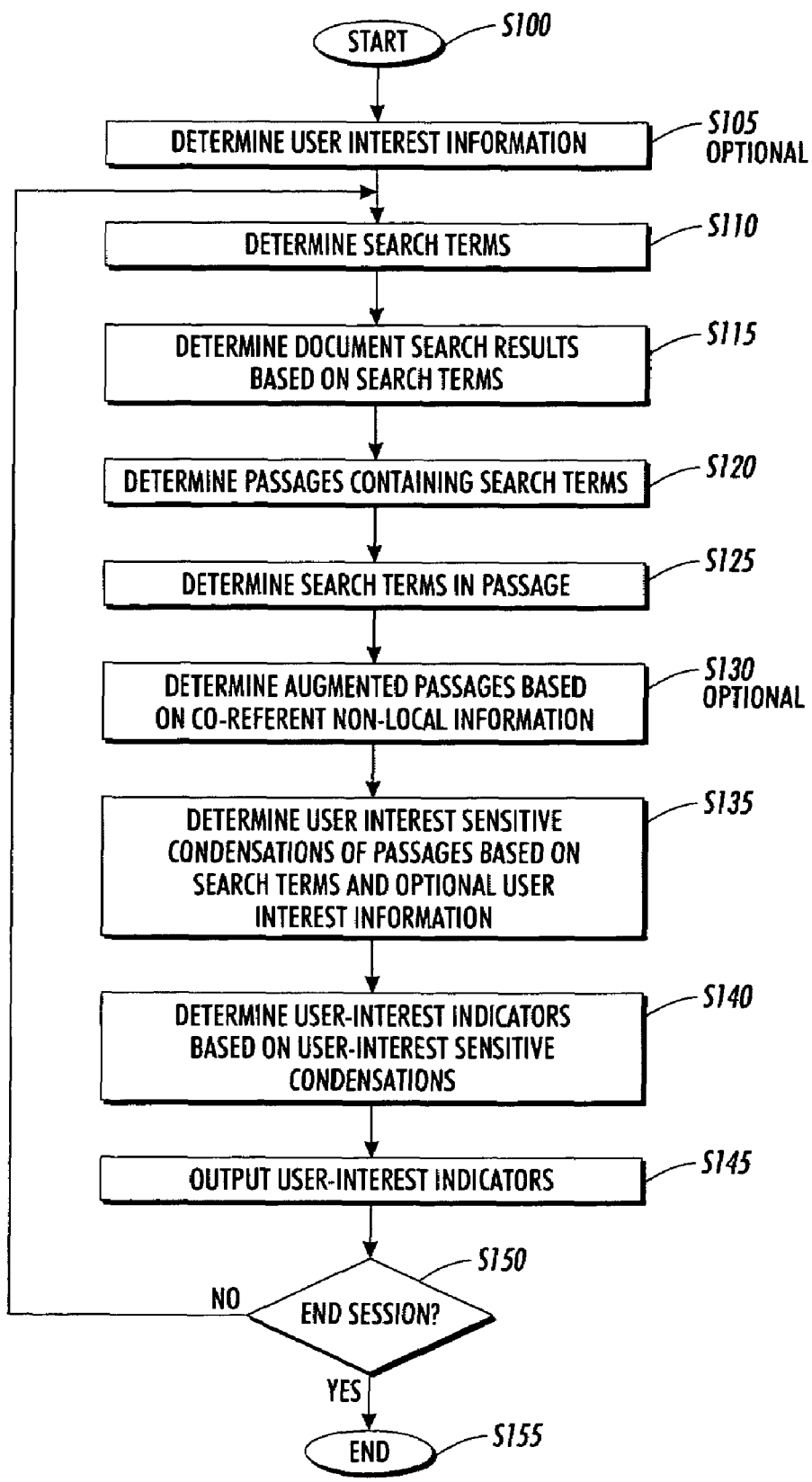
Figure 3:
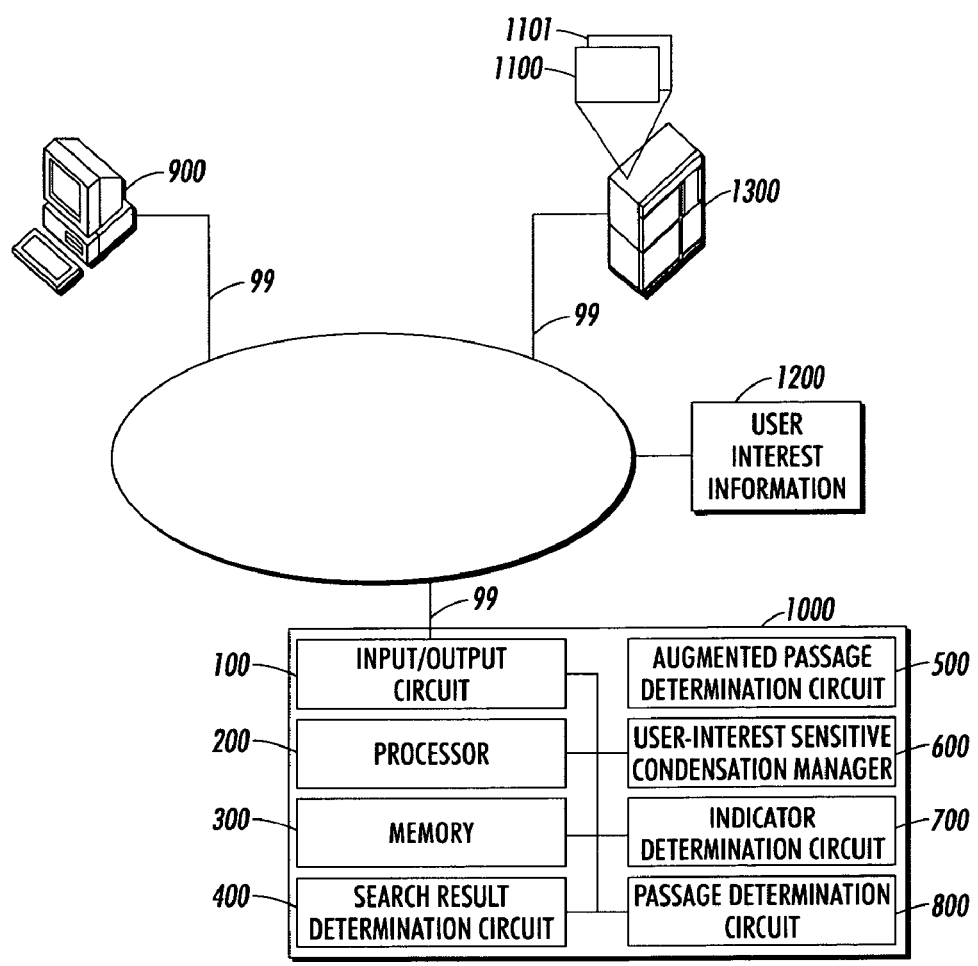
Figure 4:
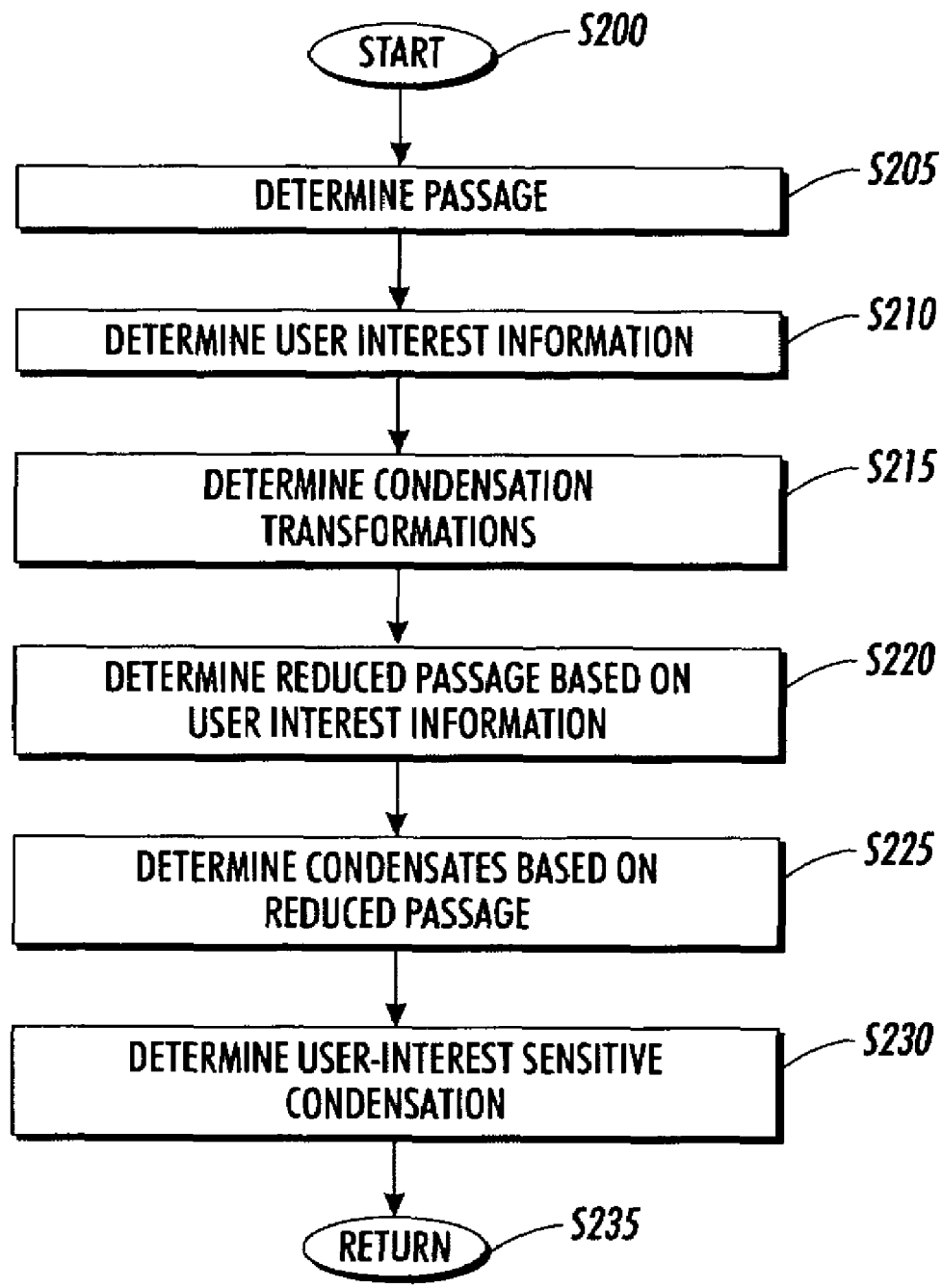
Figure 5:
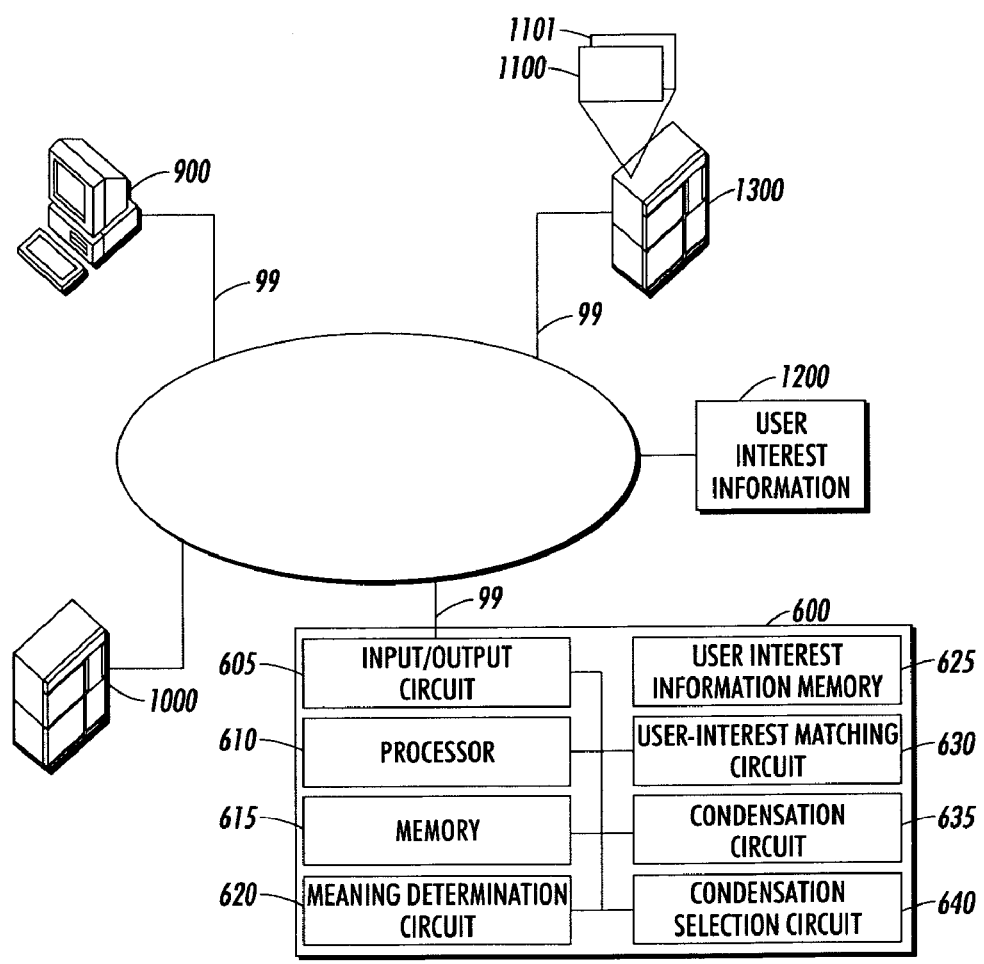
Figure 6:
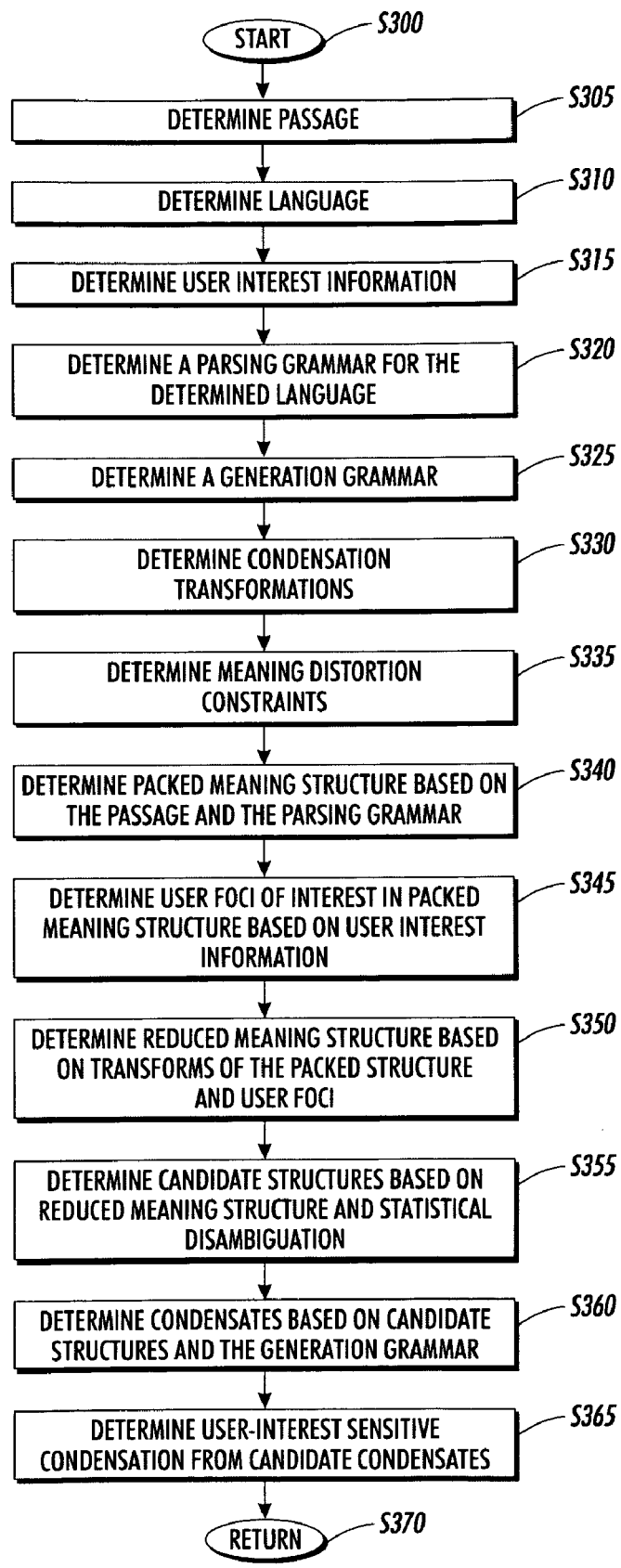
Figure 7:
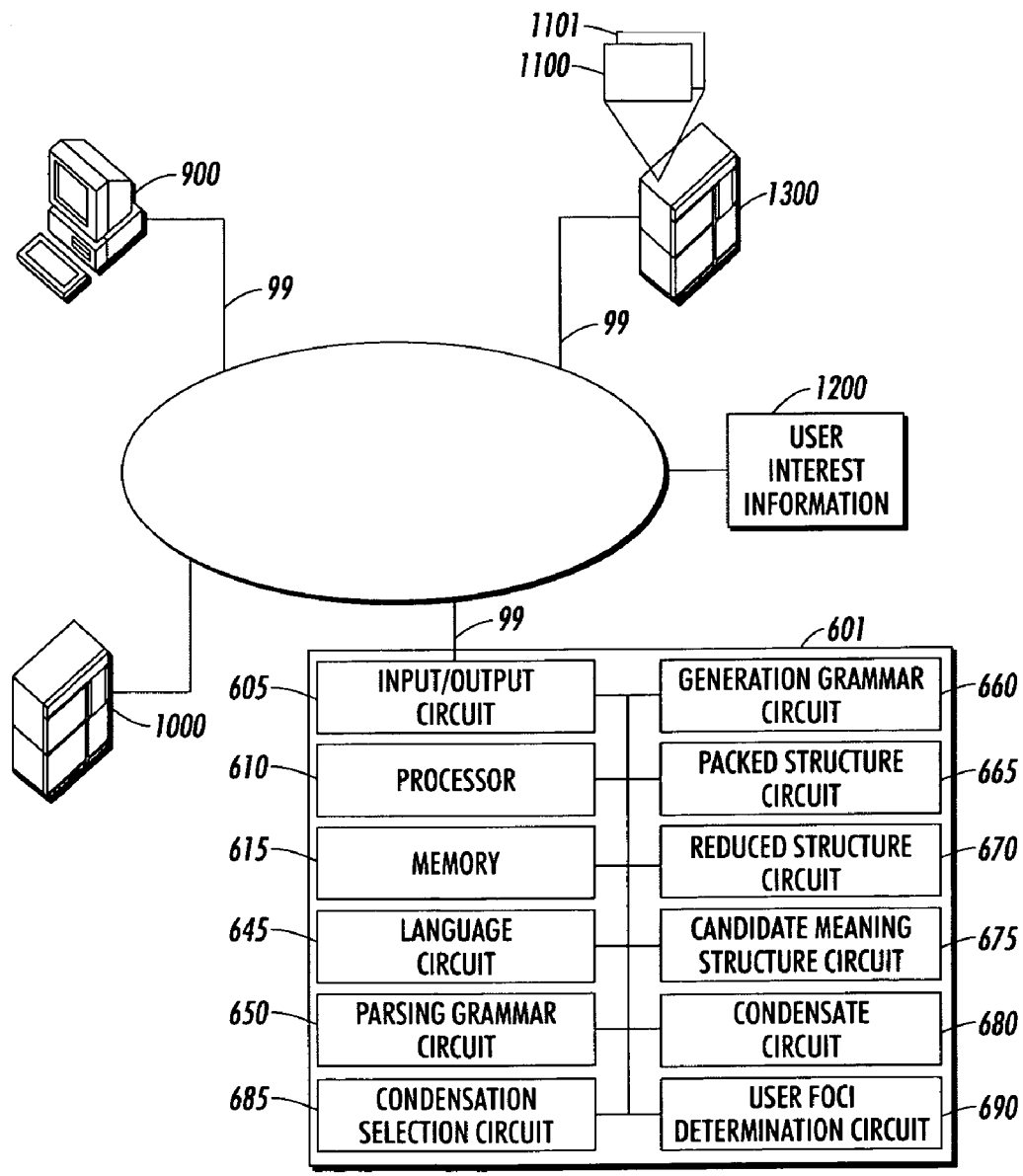
Figure 10:
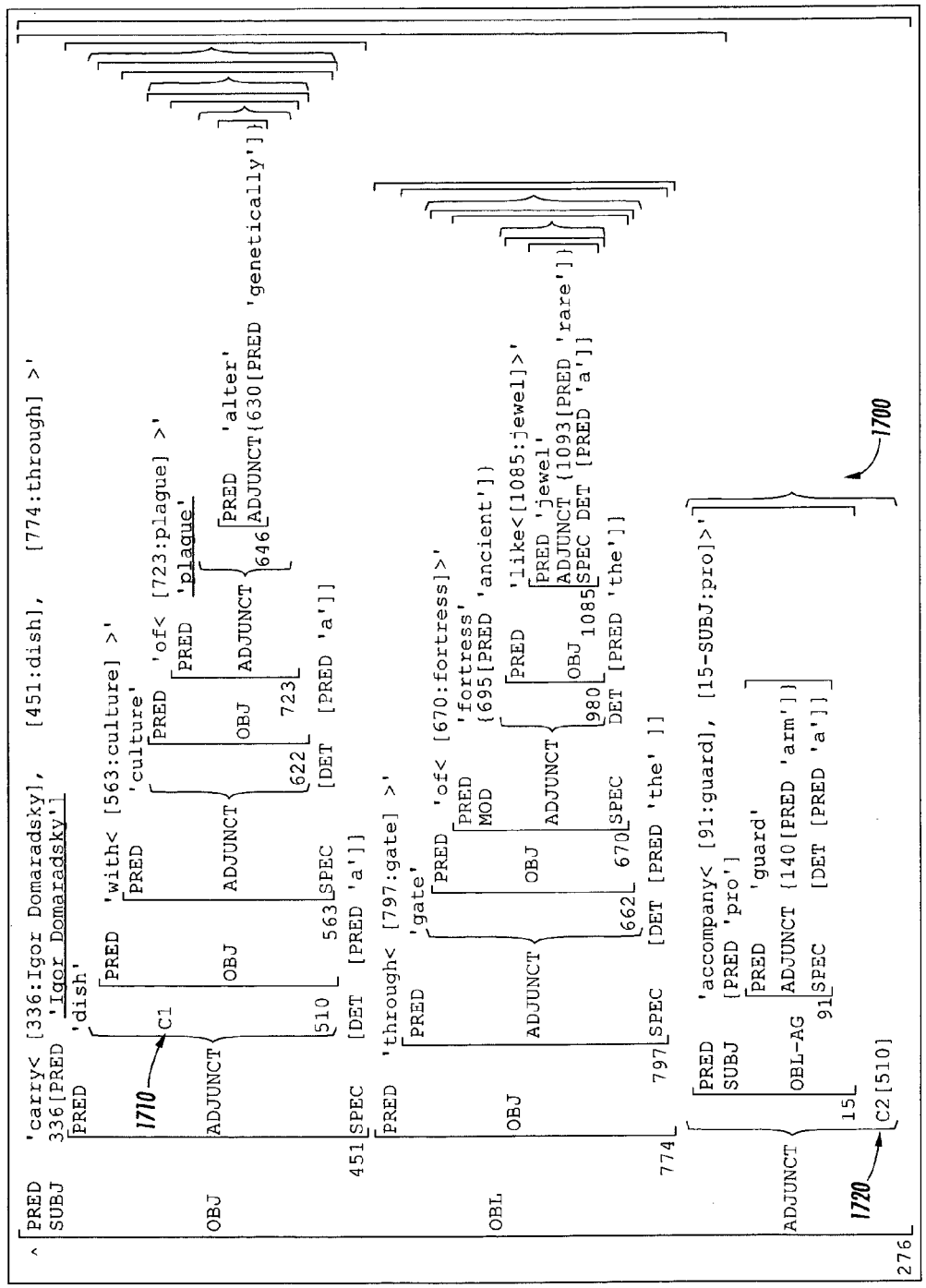
Figure 11:
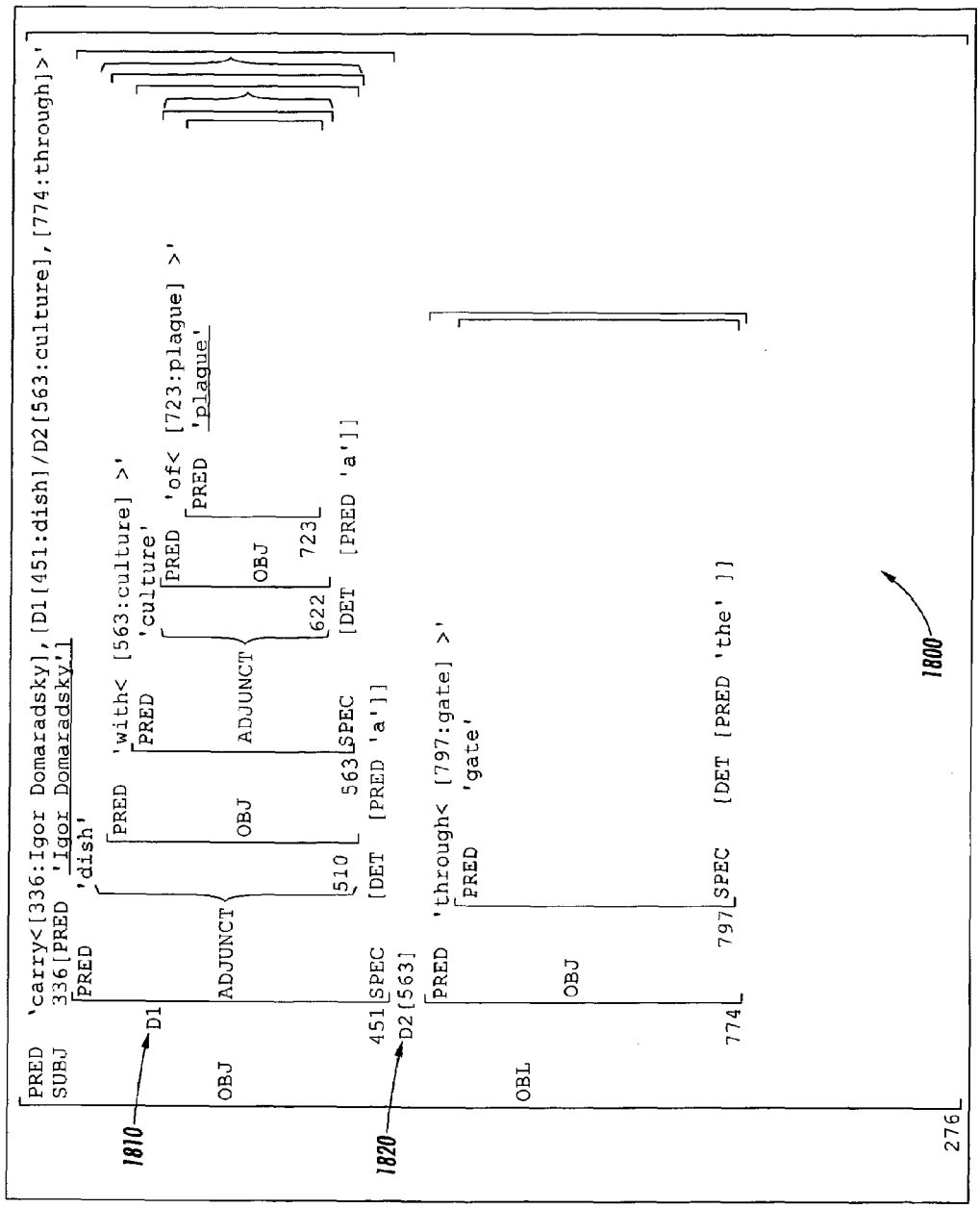
Figure 12:
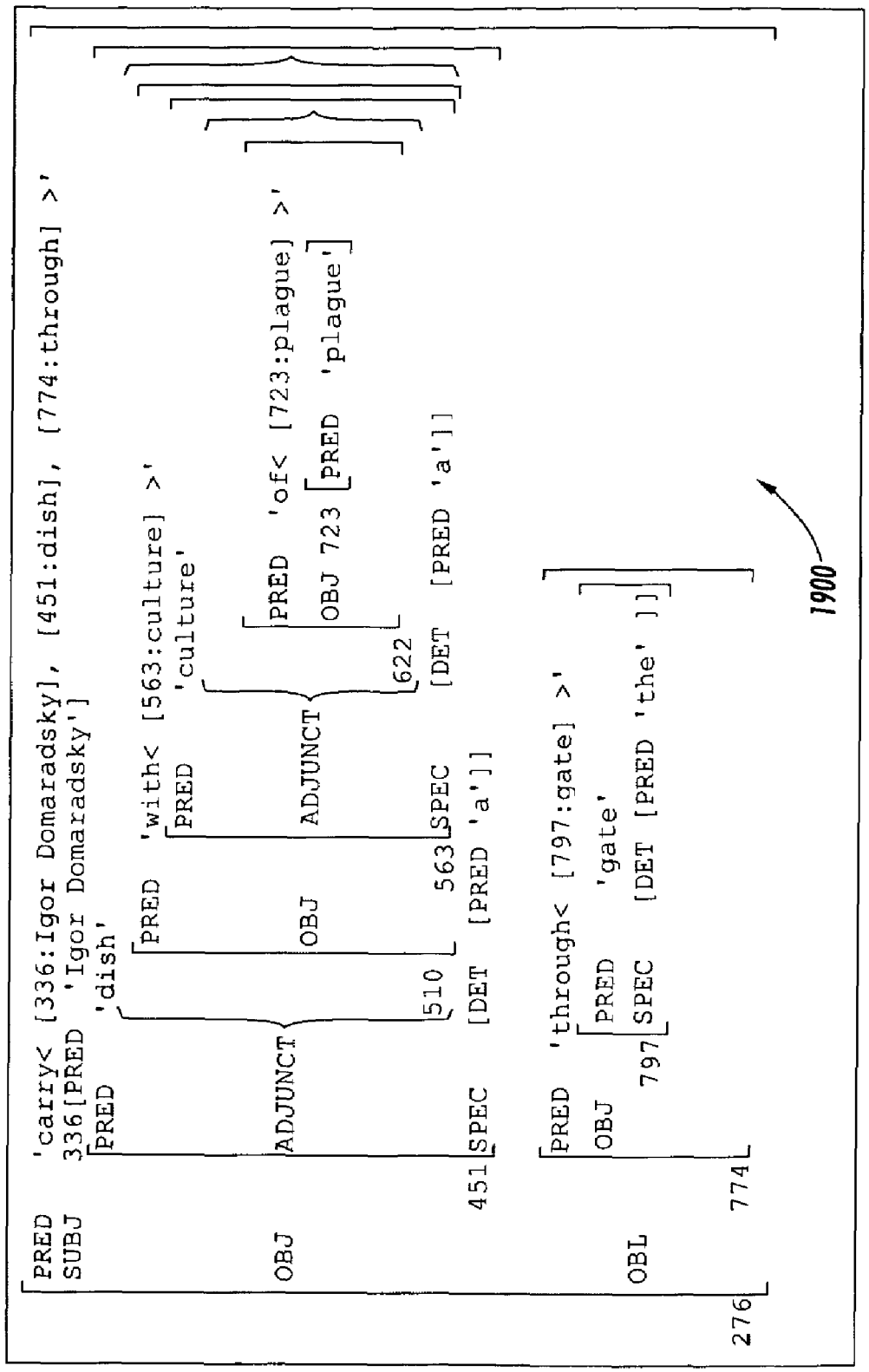
Figure 18:
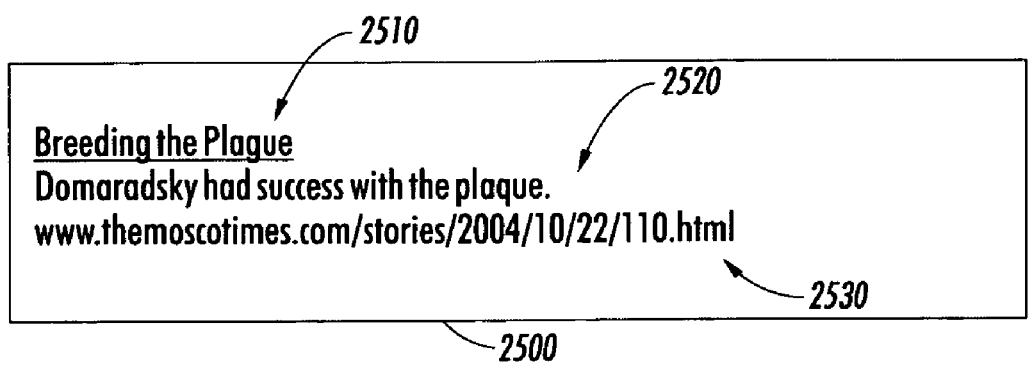
Figure 19:
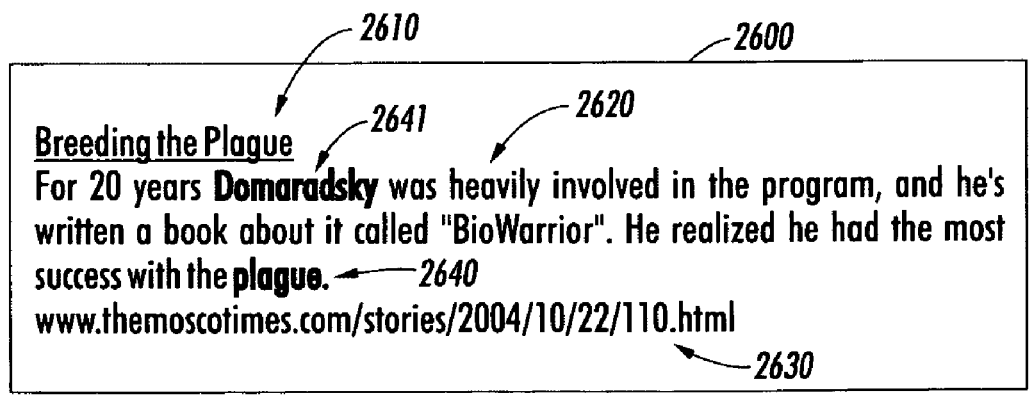
Figure 20:
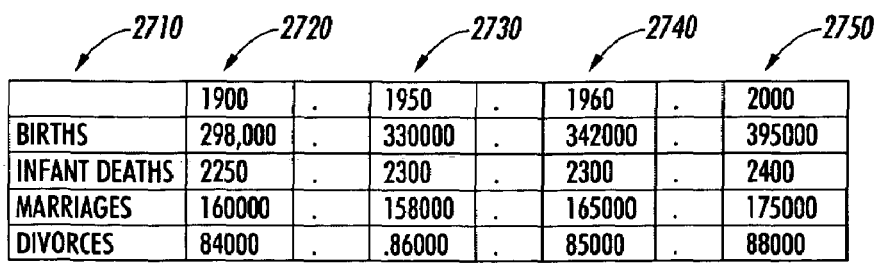
Figure 21:
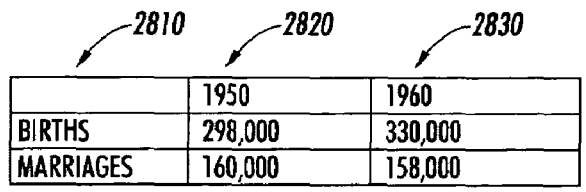
Figure 22:
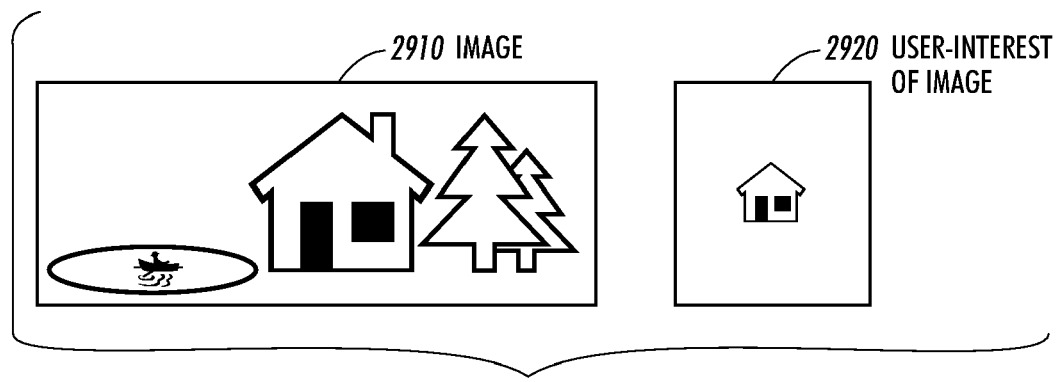

The FIG. 2 is a flowchart of an exemplary system for constructing user-interest sensitive indicators of search results according to an aspect of this invention;

FIG. 3 shows an exemplary system for constructing user-interest sensitive indicators of search results according to an aspect of this invention;

FIG. 4 is a flowchart of a first exemplary method of creating user-interest sensitive condensates according to an aspect of this invention;

FIG. 5 is an expanded view of a first exemplary user-interest sensitive condensation manager according to an aspect of this invention;

FIG. 6 is a flowchart of a third second exemplary method for creating user-interest sensitive condensates according to an aspect of this invention;

FIG. 7 is an expanded view of a second exemplary user-interest sensitive condensation manager according to an aspect of this invention;

FIG. 8 is an exemplary passage for which an indicator of meaning is to be constructed according to this invention;

FIG. 9 is a first exemplary data structure for storing user interest information according to an aspect of this invention;

FIG. 10 is an exemplary packed structure according to this invention and is a first exemplary data structure for storing user interest information according to an aspect of this invention;

FIG. 11 is an exemplary reduced packed structure according to an aspect of this invention;

FIG. 12 is a second exemplary reduced packed structure according to an aspect of this invention;

FIG. 13 is a second exemplary data structure for storing user interest information according to an aspect of this invention;

FIG. 14 is an exemplary data structure for storing meaning distortion constraints according to an aspect of this invention;

FIG. 15 is a first exemplary data structure for storing document passages according to an aspect of this invention;

FIG. 16 is a table showing conventional search results;

FIG. 17 shows an exemplary data structure for storing user-interest sensitive indicators of search result according to this invention;

FIG. 18 is an exemplary user-interest sensitive search result according to an aspect of this invention;

FIG. 19 is a second view of the exemplary user-interest sensitive search result according to an aspect of this invention;

FIG. 20 shows a tabular structure;

FIG. 21 shows an exemplary user-interest sensitive indicator of tabular search results according to an aspect of this invention; and FIG. 22 shows an exemplary user-interest sensitive indicator of image search results.

DETAILED DESCRIPTION OF EXEMPLARY EMBODIMENTS

Figure 1:
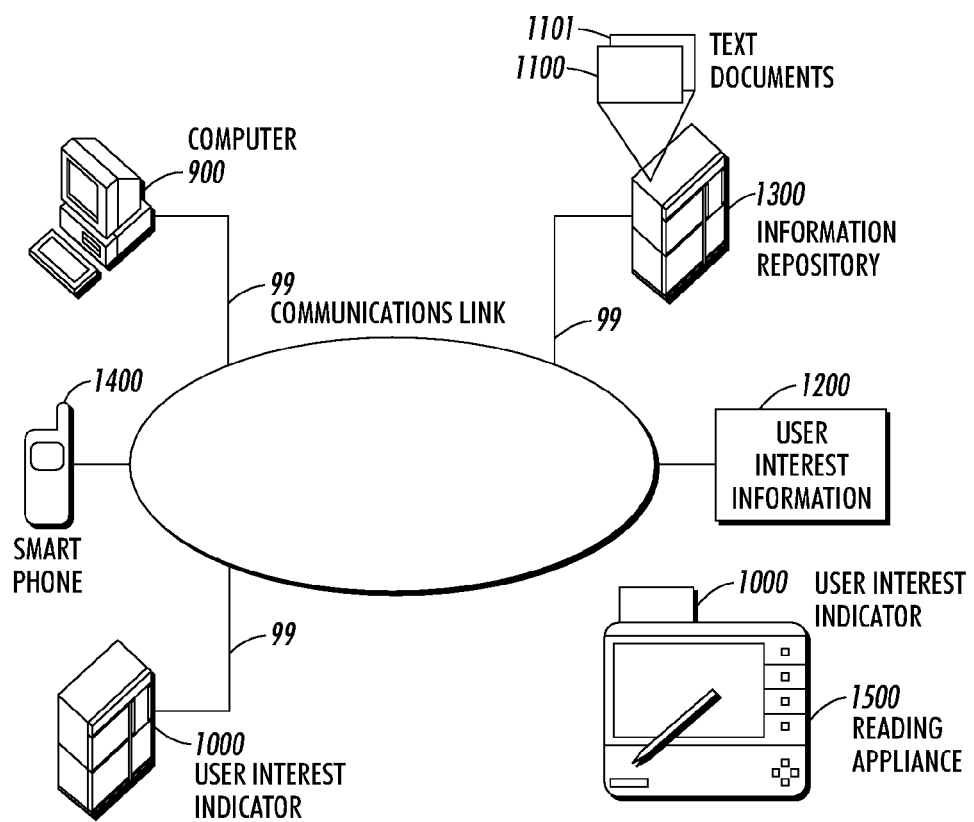
FIG. 1 is an overview of an exemplary system for constructing user-interest sensitive indicators of search results according to an aspect of this invention.

FIG. 1 is an overview of a first exemplary embodiment of a system for constructing user-interest sensitive indicators of search results 1000 according to this invention. An information repository 1300 providing access to text documents 1100-1101; a communications-enabled personal computer 900; a user interest information repository 1200; and an internet-enabled smartphone 1400 are each connectable to the system for constructing user-interest sensitive indicators of search results 1000 over communications links 99 that may be external, and/or may be internal to a particular computing configuration.

The information repository 1300 may include a web server serving files encoded in HTML, XML, and/or WML, a digital library providing access to Microsoft Word® and/or Adobe PDF® documents, or any other known or later developed method of providing access to documents 1100-1101. In a second exemplary embodiment according to this invention, the information repository 1300, the user-interest information repository 1200 and the system for constructing user-interest sensitive indicators of search results 1000 are integrated and embedded into a single device such as a personal jukebox, an Apple Computer IPod® digital storage device and/or any other known or later developed device useful for storing documents to be searched.

In a first exemplary embodiment according to this invention, the user of the communications-enabled personal computer 900 initiates a search for documents based on the search terms "Igor Domaradksy" and "plague". The system for constructing user-interest sensitive indicators of search results 1000 acts as a proxy and receives the search request, retrieves the user interest information from the user interest repository 1200 and initiates a query with a search engine, an indexing service or the like. The search engine or indexing service searches the information repository 1300 for documents containing the search terms "Igor Domaradksy" and "plague". Document passages containing the search terms and/or the search results are returned to the system for constructing user-interest sensitive indicators of search results 1000.

The system for constructing user-interest sensitive indicators of search results 1000 provides a user-interest focused signal indicative of the meaning of documents or pages identified in the search results. In various exemplary embodiments, the system for constructing user-interest sensitive indicators of search results 1000 can provide a passage of sentences or sequences of sentences in a document/page that justifies the retrieval of that document/page. Instead of presenting arbitrary substrings of that passage, the system for constructing user-interest sensitive indicators of search results 1000 signals the contents of the document and/or page by means of condensates of the passage that are sensitive to user interests. The resultant signal is focused on the user's information retrieval task. The condensates signal the meaning of the larger passage based on user-interest. The signal is in a format that reduces cognitive load on the user allowing the user to more quickly determine the relevance of the document In various exemplary embodiments according to this invention, the system for constructing user-interest sensitive indicators of search results 1000 determines a condensation of the passages associated with each document in the search result. The system for constructing user-interest sensitive indicators of search results 1000 activates an embedded user-interest sensitive condensation manager (not shown) The embedded user-interest sensitive condensation manager (not shown) determines condensates using the systems and methods described in "Systems and Methods for User-Interest Sensitive Condensation" by Kaplan et al., U.S. patent application Ser. No. 10/999,792. The embedded user-interest sensitive condensation manager (not shown) retrieves a parsing grammar to determine meaning structures associated with the passage. For each passage, the parsing grammar may determine one or more alternate meaning structures. Meaning distortion constraints are optionally determined and applied to prevent and/or to repair meaning distortions created by the condensation transformations. The meaning distortion constraints may be applied during the construction of a condensation transformation and/or after a condensation transformation has been applied, to repair meaning distortions that were created.

Condensation transformations are applied to the alternate meaning structures based on the user interest information and the optional meaning distortion constraints. The condensation transformations delete, merge and/or adjust the elements of the alternate meaning structures while ensuring that concepts of interest to the user are preserved in the resultant reduced alternate meaning structures. The elements of the user interest information are compared to the elements of the alternate meaning structures. For example, if the user interest information contains the term "plague", then elements in the alternate meaning structures conceptually related to "plague" are identified as foci of user interest. It will be apparent that elements in the alternate meaning structures can be compared based on conceptual similarity, synonym, hyponym, hypernym, statistical, distributional and various other types of similarity without departing from the scope of this invention.

For example, a measure of distributional-similarity over a large document base, such as the web may be used as a measure of similarity. Two words are distribution-similar to the extent that they tend to co-occur in the same sentences or documents with some set of other words. Thus, cancer and melanoma are distribution-similar because they co-occur with words like "treatment", "radiation" and the like.

In various exemplary embodiments according to this invention, the elements in the alternate meaning structures may include but are not limited to, Lexical Functional Grammar (LFG) structures, Head-Drive Phrase-Structure Grammar (HPSG) feature structures, HPSG minimal recursion semantic structures, and predicate argument formulas such as semantic facts. A semantic fact is a simple proposition that a particular predicate is asserted to apply to a particular set of arguments or entities. Thus, the phrase "John saw Bill" encodes the semantic fact "see(John,Bill)". The phrase "Sam realized that John saw Bill", covers two semantic facts: realize(Sam, P) where P is the proposition see(John, Bill).

Semantic facts in the alternate meaning structures matching corresponding elements in the user interest information are marked. The marked elements indicate semantic facts of greater interest and higher priority that should be retained. Condensation transformations are applied to the facts of the alternate meaning structures based on a strategy that retains marked facts and optionally elides un-marked facts.

The condensing transformations are applied to delete, merge, transform or otherwise condense facts in the alternate meaning structures to create condensed alternate meaning structures. The condensation transformations prioritize the retention of user interest foci in the condensed alternate text structures based on the similarity of facts in the alternate meaning structures and the user interest information. In various exemplary embodiments, the condensation transformations include optional meaning distortion constraints. The meaning distortion constraints reduce the likelihood of generating condensed alternate meaning structures that distort the meaning of the passage. The user interest information increases the likelihood that concepts of interest to the user expressed in the passage are retained in the condensed alternate meaning structures.

Candidate condensed structures are determined based on a disambiguation model. For example, in various exemplary embodiments according to this invention, a stochastic disambiguation model and/or a predictive model indicative of appropriate candidate structures of the selected language is determined. The stochastic and/or predictive model may be trained to assign higher probabilities to better examples in its training set and lower probabilities to less desirable or less appropriate examples. Thus, the probability serves as a surrogate for the desirable features identified in the training set. The stochastic or predictive model is then applied to the condensed alternate meaning structures to select likely candidate structures. It should be noted that the resultant candidate structures do not necessarily correspond to English or other natural language sentences.

A generation grammar is applied to the candidate structures to determine candidate condensates. After generation, the candidate condensates corresponding to grammatical sentences are optionally ranked. For example, the percentage sentence reduction length is optionally combined with the ranking of candidates obtained from the stochastic and/or predictive model. The highest ranked candidate condensate is selected as a user-interest sensitive condensation of the passage. The process is repeated for each passage identified in the search result. A user-interest sensitive indicator is then determined based on the user-interest sensitive condensates associated with each document passage. Dynamically selectable user interface elements are optionally associated with the user-interest sensitive condensation to provide expansion, compression and/or display of the user-interest sensitive condensate and related passages from the document.

In a second exemplary embodiment according to this invention, the user of internet-enabled smartphone 1400 initiates a search of the documents located in the device storage, in a remote information repository, in a remote personal computer 900, or at any other location accessible via the communications link 99.

The user-of the smartphone 1400 enters the search terms using voice recognition, short message service (SMS), keyboard and/or any known or later developed input method. In one exemplary embodiment, the user interest information is stored within the user-interest information repository 1200 and dynamically retrieved based on a user identifier. However, it should be apparent that the user-interest information may also be located on a smartcard or other storage medium within the smartphone 1400.

The search terms are used to select relevant documents stored on the smartphone 1400, or found in a remote store accessed through a communication netework. The relevant passages of the selected documents are optionally augmented to resolve non-local references. A user-interest sensitive indicator of search results is determined by applying the condensation transformations to preferentially retain passage elements based on the search terms and the retrieved user interest information. The resultant user-interest sensitive indicator of search results signals the meaning of the passage in a format more easily displayed on the smaller displays of mobile devices.

In a third exemplary embodiment according to this invention, the system for constructing user-interest sensitive indicators of search results 1000 is embedded within a standalone reading appliance 1500. The reading appliance 1500 contains an embedded information repository containing the user's personal digital library. The user of the reading appliance 1500 enters search terms which are used by an embedded search manager or service to identify passages containing the search terms within relevant documents.

An embedded system for constructing user-interest sensitive indicators of search results is activated. The interest information for the user is retrieved from a memory such as a random access memory device, a disk drive, a smartcard, a Memorystic® and/or any other storage medium useable for storing user interest information. The system for constructing user-interest sensitive indicators of search results applies previously stored condensation transformations to the passages of each document to preferentially retain elements of the passage that match the search terms and elements of the user interest information. The condensed passages reflect user-interest sensitive indicators of search results that provide a signal of the meaning of the passage.

The FIG. 2 is a flowchart of an exemplary system for constructing user-interest sensitive indicators of search results according to an aspect of this invention. The process begins at step S100 and immediately continues to optional step S105 where the user-interest information is determined. The user-interest information indicates the concepts of continuing interest to the user. The user interest information may be stored in a memory, a file or at any location accessible over a communications link or may be determined dynamically. For example, salient terms that distinguish or differentiate a document from other similar documents are pre-computed. If the user selects the document, the salient document terms are dynamically added to the user's interest information either temporarily or permanently. After the optional user-interest information has been determined, control continues to step S110.

In step S110, the search terms are entered by the user. The search terms are entered by keyboard, hand-writing or voice recognition and/or various other known and/or later developed input methods. The search terms indicate terms of immediate interest to the user. In various embodiments, the user interest information is operable to further refine and/or adjust the search terms. After the search terms have been entered, control continues to step S115.

The document search results are then determined in step S115. The document search results reflect the documents deemed most relevant to the search terms by a search service or search system. For example, in some search systems, documents are ranked based on term frequency and inverse document frequency. In various other exemplary embodiments, the terms are expanded to include related terms. In some search systems, the location of the search terms may be used to further adjust the rank of a document in the search result. However, any known or later developed method of selecting documents based on the search terms may be used to select the document search results without departing from the scope of this invention. After the document search results have been determined, control continues to step S120.

In step S120, passages in the document containing the search terms are determined. A passage includes one or more multi-word sentences. For example, in one exemplary embodiment, words preceding and following an identified search term are added to a passage until the sentence boundaries are encountered. Sentence boundaries can be indicated by punctuation, capitalization and/or various other well known indicators. After the passages containing the search terms have been determined, control continues to step S125.

The search terms within each passage are determined in step S125. The search terms are elements in the passage that are the same as, or similar to, elements of the search terms. The basis of similarity may be conceptual, inflectional, distributional and/or various other well known measures of similarity.

In optional step S130, augmented passages are determined based on co-referent non-local information. A sentence may contain a non-local reference such as a pronoun. Sentences containing anaphora and/or non-local references to concepts of interest to the user are likely to be omitted from any generated user-interest sensitive indicator since they lack an explicit mention of a user interest information element. Therefore, augmented passages are optionally determined.

The anaphora and/or non-local referents in the passages are resolved to produce an augmented passage. The passage "Igor Domaradsky worked on bioweapons. He was most focused on plague." provides an example. The optional augmentation makes the second sentence equivalent to "Igor Domaradksy was most focused on plague." The augmentation of a passage with a non-local reference allows the concepts to be more appropriately condensed. After the augmented passages have been determined, control continues to step S135.

The user interest sensitive condensations of the passages are determined based on the search terms and optional user-interest information in step S135. The search terms and any related concepts are preferentially retained in the condensation. The resultant user-interest sensitive condensation reflects the meaning of the passage.

In other exemplary embodiments, the user interest information is used to further prioritize the retention of elements in the passage. For example, in one embodiment, search terms are assigned higher weights than the user-interest information elements based on the rationale that the user explicitly and intentionally expressed an interest in the search terms. In contrast, the user interest information reflects information of more general or less specific interest to the user and is therefore accorded less weight. In various other embodiments according to this invention, the search terms and user-interest information are combined using a priority union. The priority union resolves any conflict between the search terms and the user interest information in favor of the search terms. After the user-interest sensitive condensates have been determined, control continues to step S140.

In step S140, user-interest sensitive indicators are determined based on the condensates. It will be apparent that in some cases, the user-interest sensitive indicators may include multiple condensates. That is, if multiple passages are selected to represent a document, each passage is associated with a condensate. In various exemplary embodiments according to this invention, the condensates are selected based on statistical indications of how well the passages represent the overall concepts found in the document, and/or how well such terms distinguish this document from other documents in a collection. After the indicators have been determined, control continues to step S145 and the user-interest sensitive indicators are output. The user-interest sensitive indicators may be output to a computer display, a voice synthesizer, a tactile display and/or various other known or later developed output devices. Control then continues to step S150.

In step S150, a determination is made as to whether a termination of the current session has been initiated and/or requested. Termination may be initiated with a key sequence, by shutting down the machine, exceeding a timer and/or the like. If no end-of-session is determined, control continues to step S110 and steps S110-S150 are repeated. When it is determined in step S150 that the session has ended, control continues to step S155 and the process ends.

FIG. 3 shows an exemplary system for constructing user-interest sensitive indicators of search results 1000 according to an aspect of this invention. The user of communications-enabled personal computer 900 initiates a search request for a text document located in information repository 1300. The search request is forwarded to the input/output circuit of the system for constructing user-interest sensitive indicators of search results 1000 which mediates the user request. The system for constructing user-interest sensitive indicators of search results 1000 activates the search result determination circuit 400 to determine documents in the result set that satisfy the user query.

The passage determination circuit 800 is activated to determine the passages in each document containing the search terms. The optional augmented passage determination circuit 500 is activated to resolve any anaphora and/or non-local references in the passages. The resolution of anaphora and/or non-local references helps ensure that the concepts of interest to a user are embedded in the relevant context.

The processor 200 then activates the user-interest sensitive condensation manager 600 to determine a user-interest condensate for the passage. The user-interest sensitive condensation manager 600 uses condensation transformations to preferentially retain passage portions containing the search terms and user interest information while omitting information less germane to the interests of the user. The user-interest sensitive condensate provides a user-interest focused signal of the meaning of the document.

The processor activates the indicator determination circuit 700 to determine a user-interest sensitive indicator for each document in the search result. The indicator determination circuit 700 optionally associates selectable user interface components with the user-interest sensitive indicators that provide for viewing the associated documents.

FIG. 4 is a flowchart of a first exemplary method of creating user-interest sensitive condensates according to an aspect of this invention. The process begins at step S200 and immediately continues to step S205.

In step S205, the passage to be condensed by user-interest sensitive condensations is selected. The passage to be condensed is read from an information repository, index server, or search engine search results. For example, in one exemplary embodiment, a protocol is used to communicate the relevant passages directly from the search engine or information repository to the system for constructing user-interest sensitive search result indicators.

The passage may be augmented by non-local information from phrases that are co-referent with elements of the passage. Methods for determining co-reference of phrases in a passage are described in "Special Issue on Computational Anaphora Resolution", vol. 27, No. 4, Journal of Computational Linguistics, 2001, here-in incorporated by reference in its entirety. After the passage has been input and/or determined, control continues to step S210 where user interest information is determined. After the user interest information has been determined, control continues to step S215.

In step S215, the condensation transformations are determined. The condensation transformations reduce the selected passage by merging, deleting and/or changing elements. In various exemplary embodiments, the condensation transformations are expressed as rewrite rules or functions in the Xerox Linguistic Environment (XLE). However, various other linguistic tools, functions and/or environments can also be used to create a condensation transformation without departing from the scope of this invention. After the condensation transformations have been determined, control continues to step S220.

A reduced passage is determined based on the user interest information and the condensation transformations in step S220. The condensation transformations are selectively applied to remove modifiers and other less salient information from the passage based on the identified user interest information. After the reduced passage is determined, control continues to step S225

In step S225, one or more candidate condensates are determined based on the reduced passage. The candidate condensates indicate a user focused representation of the meaning of the passage. The candidate condensates are optionally ranked for selection based on stochastic and/or predictive models. After the candidate condensates have been determined, control continues to step S230.

A user-interest sensitive condensate is determined based on one of the candidate condensates and the passage in step S230. The condensate provides a user-interest focused signal of the passage from the document.

The condensate and associated passage are selectively displayable based on user actions. For example, a click on the condensate portion of a user interest sensitive note optionally displays the associated passage portion. After the user-interest sensitive condensate has been determined, control continues to step S235 and the process returns to step S135 of FIG. 2. Control then immediately continues to step S140.

FIG. 5 is an expanded view of a first exemplary user-interest sensitive condensation manager 600 according to an aspect of this invention. The first exemplary user-interest sensitive condensation system 600 comprises a processor 610; a memory 615; a meaning determination circuit 620; a user interest information memory 625; a user interest matching circuit 630; a condensation circuit 635; and a condensation selection circuit 640; each connected to input/output circuit 605 and via communications link 99 to a communications-enabled personal computer 900; a user-interest information repository 1200; an information repository 1300 serving texts 1100-1101; and to the system for user-interest sensitive indicators of meaning 1000.

A user of the communications-enabled personal computer 900 initiates a search request for one or more documents in the information repository 1300 based on a set of search terms. The request is mediated by the system for constructing user-interest sensitive indicators of search results 1000. The system for constructing user-interest sensitive indicators of search results 1000 retrieves passages from documents in the search results that contain the search terms. The passages are selected by retrieving the original document and identifying passages containing the search terms, having the search service identify the passages with a protocol and/or using any other method of identifying passages containing the search terms. In various exemplary embodiments according to this invention, an augmented passage is determined in which any anaphoric and/or other non-local references in the passage are resolved. The passages are then forwarded over communications link 99 to the user-interest condensation manager 600. The input/output circuit 605 of the user-interest sensitive condensation manager 600 receives the search terms and the relevant passages. It will be apparent that in various exemplary embodiments, the user interest condensation manager 600 is incorporated within the system for constructing user-interest sensitive indicators of meaning 1000 and/or placed at any location accessible via communications links 99, without departing from the scope of this invention.

The processor 610 retrieves the user interest information from the user interest information repository 1200 and stores the user interest information in memory 615. The user interest information indicates the concepts of interest to the user. The user interest information is expressed using one or more terms or keywords, synonyms, hypernyms, hyponyms and/or various other known or later developed methods of describing and/or defining concepts of interest to the user. The search terms and the user-interest information are optionally combined using the priority union as further described in R. Kaplan's "Three seductions of computational psycholinguistics" in Peter Whitelock, Mary McGee Wood, Harold L. Somers, Rod Johnson, and Paul Bennett (editors), *Linguistic Theory and Computer Applications*, pp. 149-188. London: Academic Press, 1987, here-in incorporated by reference in its entirety. However, it should be apparent that any method of combining the search terms and the user interest information that preferentially preserves the search terms in any conflict can also be used in the practice of this invention. The processor 610 then activates the meaning determination circuit 620 to determine alternate meaning structures for the passage.

The processor 610 activates the user interest matching circuit 630. The user interest matching circuit 630 determines user interest foci within the alternate meaning structures of the passage. The user interest foci are elements of the alternate meaning structures that are similar to elements of the user interest information. The user interest foci therefore reflect the information content of the passage of greatest interest to the user.

The processor 610 retrieves previously stored condensation transformations from memory 615. In various other exemplary embodiments according to this invention, the condensation transformations are retrieved from a disk file, a remote server and/or any other type of storage device. The storage device may be located at any location accessible via communications link 99.

The processor 610 then activates the condensation circuit 635 to condense the meaning of the passage to one or more condensates. The condensation circuit 635 applies the condensation transformations to reduce the size of the alternate meaning structures by merging, deleting and/or changing elements. The condensation transformations are expressed as rewrite rules or functions in the Xerox Linguistic Environment (XLE). However, various linguistic tools, functions and/or environments can also be used to create a condensation transformation without departing from the scope of this invention. The condensation circuit 635 determines reduced meaning structures based on a strategy that increases the likelihood of retaining the interest foci in the resultant reduced meaning structures. Candidate condensates are then determined and the processor 610 ranks the candidate condensates.

The condensation selection circuit 640 is then activated to determine the best candidate condensate. The best condensate is transferred to the system for constructing user-interest sensitive indicators of search results 1000. In one exemplary embodiment, the system for constructing user-interest sensitive indicators of search results 1000 determines a search result indicator based on the condensate and the passage. Selectable user interface elements are optionally associated with the user-interest sensitive indicator. The dynamic and selectable user interface elements are operable to expand/compress and/or otherwise transform the display of, all or portions of the user-interest sensitive indicator.

FIG. 6 is a flowchart of a third exemplary method for creating user-interest sensitive condensates according to an aspect of this invention. The process begins at step S300 and immediately continues to step S305 where the passage to be condensed is determined.

In step S305, one of the passages of text to be condensed is determined. The text passage is one or more multi-word sentences selected from the document identified by the search. After the passage is selected and/or determined, control continues to step S310 where the language characteristic associated with the passage is optionally determined.

In various exemplary embodiments of this invention, the language characteristic associated with the passage is determined using XML and/or HTML language identification tags, linguistic analysis of the passage and/or any known or later developed method of determining language. After the language characteristic of the passage is determined, control continues to step S315.

In step S315, the user interest information is determined. The user interest information includes but is not limited to one or more explicit and/or non-explicit conceptual expressions of user interest. For example, in one exemplary embodiment, explicit user information is captured in the form of keywords from a dialog box or other input element. A lexicon such as WordNet may be used to create sets of concept terms such as synonyms, hyponyms, hypernyms and instances that are related to explicit terms of interest. The keyword input and related concepts reflect the information of interest to the user.

In other exemplary embodiments according to this invention, the user interest is determined from indirect and/or non-explicit expressions of user interest. For example, in one embodiment, user interest information is optionally determined based on inferences drawn from user browsing patterns within libraries and/or data repositories. In still other embodiments, a user's curriculum vitae, academic course listings, academic and or professional degree programs, professional specialty, hobbies and/or various other user-related information is used to determine the user interest information. After the user interest information is determined, control continues to step S320.

In step S320, a parsing grammar is determined. The parsing grammar is determined based on the determined language characteristic, the genre of the selected text and/or any known or later developed characteristic of the passage or the text from which it is selected. Any one or combination of a lexical functional grammar, a head-driven phrase structure grammar, a lexicalized tree adjoining grammar, a combinatory categorical grammar or any known or later developed grammar useful in parsing a passage into a meaning structure may be used in the practice of this invention.

In one exemplary embodiment, a first parsing grammar based on the "English" language and "newspaper" genre characteristics of the passage is selected. A second parsing grammar, based on the "English" language and "scientific publication" genre characteristics is selected to parse English language "Bio-Engineering" articles. In this way, a parsing grammar is selected that recognizes language structures associated with each text and/or passage. The parsing grammar may be a previously determined generic grammar, a grammar based on the text and/or specific properties of the text. After the parsing grammar is determined, control continues to step S325.

The generation grammar is determined in step S325. The generation grammar ensures the condensates conform to the grammar of the selected language. The generation grammar may be the same as the parsing grammar. For example, any one or combination of a lexical functional grammar, a head-driven phrase structure grammar, a lexicalized tree adjoining grammar, a combinatory categorical grammar or any known or later developed grammar useful in generating sentences that express the information in a meaning representation may be used in the practice of this invention. A sentence is a meaningful structure that follows grammatical rules. Condensate are smaller structures of the same or similar type that indicate the meaning of the sentence. Thus, a table of information is a sentence. In one exemplary embodiment, the condensate of a table of information is a projection of the table containing the search and user interest elements that provide a user-interest sensitive signal of the meaning.

In various embodiments according to this invention, a version of a lexical functional grammar is used as a generation grammar. To the extent that the lexical functional grammar accurately models the properties of a natural language such as English, the output produced will be grammatical. A version of the lexical functional grammar is used to generate these grammatical condensed sentences. However, it should be apparent that any known or later developed grammar may be used for either the parsing and/or the generation portions of this invention. After the generation grammar is determined, control continues to step S330.

In step S330, the condensations transformations are determined. The condensation transformations delete, merge and/or change elements of the alternate meaning structures. The condensation transformations use re-write rules, and/or any other known or later developed method of transforming a meaning structure. After the condensation transformations have been determined, control continues to step S335.

The meaning distortion constraints are determined in optional step S335. The meaning distortion constraints are optionally applied to each condensation transform. The meaning distortion constraints ensure that the condensation transformations applied to the passage do not distort the meaning of the passage. For example, the passage, "The CEO believes that $4^{th}$ quarter earnings will improve" might be condensed to "The $4^{th}$ quarter earnings will improve". However, the value of the resultant condensate is limited since it distorts the meaning of the passage: the passage expresses only a belief, not a fact. By applying the optional meaning distortion constraints in conjunction with, and/or in the formulation of the condensation transformations, the condensates that distort the meaning of the associated passage are less likely to be generated and/or are discarded from consideration. In various exemplary embodiments according to this invention, the meaning distortion constraints can be separately applied to the condensation transformations during a previous and/or contemporaneous step without departing from the scope of this invention. After the optional meaning distortion constraints have been determined, control continues to step S340.

In step S340, a packed meaning structure of alternate meanings is determined based on the passage and the parsing grammar. In one exemplary embodiment according to this invention, the packed f-structure meaning representation of the Xerox Linguistic Environment (XLE) is used as the packed meaning structure. The XLE f-structures are discussed further in U.S. patent application Ser. No. 10/435,036, by Riezler et al.; and in "Statistical Sentence Condensation using Ambiguity Packing and Stochastic Disambiguation Methods for Lexical Functional Grammar", by Riezler et al, published in the Proceedings of HLT-NAACL 2003, Main Papers, pp. 118-125, Edmonton, Alberta, Canada May-June 2003, each, herein incorporated by reference in their entirety. However, it should be apparent that various other meaning representations may also be used without departing from the scope of this invention.

The packed f-structure representation of the Xerox XLE environment efficiently encodes natural language ambiguity by determining a list of contexted linguistic facts for a text passage. The contexted linguistic facts are of the form $C_i \rightarrow F_i$, where $C_i$ is a context and $F_i$ is a linguistic fact. The context is typically a set of choices drawn from an and-or forest that represents the ambiguity of the passage or sentence. Each linguistic fact in the packed f-structure representation of the Xerox XLE environment occurs only once in the structure even though it may be part of several of the alternate meanings that the packed structure represents. This normalization of linguistic facts facilitates finding and transforming elements.

For example, natural language ambiguity may result in multiple possible meanings represented by a specific packed f-structure. In the Xerox XLE environment, the packed f-structure encodes the multiple meanings but does not require duplicating the elements common to several meanings. For example, the phrase, "the duck is ready to eat" has 2 meanings. The duck is hungry or the duck is cooked. However, the packed f-structure representation of the Xerox XLE allows the two meanings to share the "the duck", as a common substructure. Thus, the time necessary to operate on the information contained in a packed f-structure meaning structure is decreased because it is not necessary to operate on common substructures multiple times. Disjunctive unification and packed f-structures are discussed further in U.S. Pat. No. 5,438,511, herein incorporated by reference in its entirety. After the packed meaning structure is determined, control continues to step S345.

In step S345, the user foci in the packed structure are determined based on the user interest information. The user foci are elements in the packed meaning structure that match or are similar to corresponding elements in the user interest information. Thus, in one exemplary embodiment, elements in the user interest information are matched against corresponding elements of the packed meaning structure to determine user foci. The matching elements in the packed meaning structure are then marked as user foci of interest. The matching occurs based on literal, conceptual, and/or statistical similarity between the concepts expressed in the user interest information and the concepts expressed in the packed meaning structure. After the user foci of interest have been determined, control continues to step S350.

A reduced meaning structure of the packed meaning structure is determined based on the user foci of interest, meaning distortion constraints and the transformations in step S350. The condensation transformations applied to the elements of the packed meaning structure may include, but are not limited to deleting less salient elements, substituting shorter or more compact elements and/or changing elements. The condensation transformations are constrained to preserve or prioritize the user foci of interest and avoid distorting the meaning of the passage. For example, in various exemplary embodiments according to this invention, facts encoded in the packed f-structure meaning representation of the Xerox XLE are transformed based on the condensation transformations. The condensation transformations encode actions or procedures that reduce the occurrence of less salient and/or less relevant information in the exemplary packed structural representation by adding, deleting or changing facts. The resultant reduced structure associated with the transformed facts represents an efficient encoding of each possible condensed meaning structure. After the reduced structure is determined, control continues to step S355.

In step S355, the most likely candidate structures are determined from the reduced structure based on a stochastic disambiguation model. The candidate structures are determined using stochastic, lexical semantic and/or any known or later developed disambiguation method. For example, in one of the exemplary embodiments according to this invention, a statistical analysis of exemplary reduced structures is used to determine a maximum likelihood disambiguation model.

A predictive disambiguation model is then used to determine the most likely reduced meaning structures from the reduced meaning structures based on property functions such as: attributes; attribute combinations; attribute value-pairs; co-occurrences of verb-stems; sub-categorization frames; rule trace information and/or any known or later developed features of the meaning structures. For example, in various exemplary embodiments according to this invention, a set of possible candidate structures S(y) for each sentence y in training data $$\{(s_j, y_j)\}_{j=1}^{m}$$

is determined. The predictive disambiguation model is trained based on the conditional likelihood $L(\lambda)$ of a reduced meaning structure for each given sentence based on the formula:

$$L(\lambda) = \log \prod_{j=1}^{m} \frac{e^{\lambda \cdot f(s_j)}}{\sum_{s \in S(y_j)} e^{\lambda \cdot f(s)}} \quad (1)$$

where $f$ are property functions and y and s are original sentence to gold-standard reduced meaning structure pairs. Candidate structures are then determined based on the predictive disambiguation model and the reduced meaning structure. The candidate structures are a subset of the full set of reduced meaning structures based on a threshold on their probabilities as determined by the stochastic disambiguation model. After the most likely candidate structures are determined, control continues to step S360.

The condensates are determined in step S360. For example, in one embodiment, a generation grammar is used in conjunction with the most likely candidate structures to determine one or more well formed sentences usable as condensates representative of the meaning of the passage. After the candidate condensates have been determined, control continues to step S365 where one of the candidate condensates is selected as a user-interest sensitive condensate for the passage. Control then continues to step S370 and the process ends.

FIG. 7 is an expanded view of a second exemplary user-interest sensitive condensation manager 601 according to an aspect of this invention. The user-interest sensitive condensation manager 601 comprises a processor 610; a memory 615; a language circuit 645; a parsing grammar circuit 650; a generation grammar circuit 660; a packed structure circuit 665; a reduced structure circuit 670; a candidate meaning structure circuit 675; a condensation circuit 680; a user foci determination circuit 690 and a condensation selection circuit 685; each connected to an input/output circuit 605 and via communications link 99 to a communications enabled personal computer 900; an information repository 1300 serving texts 1100-1101; a system for constructing user-interest sensitive indicators of search results 1000 and an optional user interest information repository 1200.

A user of the communications-enabled personal computer 900 initiates a search request for documents relevant to a set of search terms. The search request is mediated by the system for constructing user-interest sensitive indicators of search results 1000. The system for constructing user-interest sensitive indicators of search results 1000 optionally performs a search and/or submits the search to a $3^{rd}$ party search engine (not shown). The resultant search results are returned with one or more passages from each selected document. The passages are the portions of each document containing the search terms. Each of the passages and associated search terms are forwarded over communications links 99 to the user-interest sensitive condensation manager 601. The input/ output circuit 605 of the user-interest sensitive condensation manager 601 receives the passages and search terms from the system for constructing user-interest sensitive indicators of search results 1000.

The processor 610 activates the input/output circuit 605 to retrieve the user interest information from the memory 615 and/or user interest information repository 1200. The user interest information indicates concepts of interest to the user. The user interest information may be expressed using one or more terms, synonyms, hypernyms, hyponyms and/or any known or later developed method of describing and/or defining the information of interest to the user. The search terms are adjusted with the user-interest sensitive information to create new user-interest information. The adjustments should ensure that user disinterest expressed in the user interest information does not exclude an explicit indication of interest evidenced in a search term. Thus, in various exemplary embodiments according to this invention, the search terms and the user interest information are combined using the priority union described by R. Kaplan in "Three seductions of computational psycholinguistics" in Peter Whitelock, Mary McGee Wood, Harold L. Somers, Rod Johnson, and Paul Bennett (editors), *Linguistic Theory and Computer Applications*, pp. 149-188. London: Academic Press, 1987, as discussed above. The priority union ensures that the union occurs and in cases of conflict, that the search terms take precedence over the user interest information elements. However, it should be apparent that any known or later developed method of combining the search and user interest information may be used if it ensures the precedence of the search terms in the resultant combination.

The processor 610 activates the language circuit 645 to determine the language of the passage. The language circuit 645 uses XML tags, characteristics of the passage and/or any known or later developed means for determining the language of the passage.

The processor 610 activates the packed structure circuit 665 to determine one or more packed meaning structures for the passage. The parsing grammar circuit 650 is activated to determine the parsing grammar based on the style or genre and/or the language of the passage. The processor 610 uses the parsing grammar to encode the passage into a packed meaning structure. The packed structure may include, but is not limited to the packed f-structure of the Xerox Linguistic Environment (XLE), the feature structures of head-driven phrase structure grammars, the trees of tree-adjoining grammars, collections of semantic facts or any known or later developed text structure capable of encoding the meaning of the passage.

The user foci determination circuit 690 is activated to determine the user interest foci within the packed structure. For example, in one exemplary embodiment, literal matches between elements in the user interest information and the elements of the packed structure are determined. In still other exemplary embodiments, matches between elements of the user interest information and the elements of the packed structure are based on conceptual and/or other types of similarity.

The processor 610 activates the reduced structure circuit 670 to remove less salient information from the packed structure. In various embodiments, the determined user interest foci indicate meaning structure elements of subjective importance to the user. The condensation transformations and one or more meaning distortion constraints previously stored in memory 615 are applied to the packed structure to determine a reduced packed structure. The condensation transformations and the one or more meaning distortion constraints are applied to the packed structure to retain as many of the user interest foci as possible while ensuring the resultant reduced packed structure does not distort the meaning of the passage.

Candidate structures are extracted from the reduced packed structure by the candidate meaning structure circuit 675. The stochastic disambiguation model is retrieved from memory 615 and used to select the likely candidate structures. The generation grammar circuit 660 determines a generation grammar. The condensate circuit 680 is activated to determine the candidate condensates based on the candidate meaning structures and the generation grammar. The condensation selection circuit 685 is activated to select the user-interest sensitive condensate from the candidate condensates.

The condensate is then optionally associated with the passage. The generated condensate and optionally associated passage are then forwarded via communications link 99 to the system for constructing user-interest sensitive indicators of search results 1000. The system for constructing user-interest sensitive indicators of search results 1000 uses the user-interest sensitive condensates, the search results and the passage to create a user-interest sensitive indicator. The processor 610 repeats the process for each selected passage and for each document in the search result. In various other exemplary embodiments, the system for constructing user-interest sensitive indicators of search results 1000, associates the condensate with the relevant passage.

FIG. 8 is an exemplary passage for which an indicator of meaning is to be constructed according to this invention. The exemplary passage contains a sentence with several modifiers. For example, one portion of the sentence gives a detailed description of the manner in which a dish of plague was transported through the gates of the fortress. The description of the manner in which the dish was transported through the gates does not coincide with information in which the user has expressed an interest. Thus a condensate for the passage "Igor Domaradsky carried a dish with a culture of plague through the gates" is generated. A user-interest sensitive indicator of meaning is determined based on the condensate and the passage. Although the condensate portion of the user-interest sensitive indicator of search results lacks the description of how the dish was transported, the condensate is suitable to signal the user-interest focused meaning of the passage.

FIG. 9 is a first exemplary data structure for storing user interest information according to an aspect of this invention. Each row in the data structure for storing user interest information contains a user interest element. The elements are optionally expanded and/or reduced using logic operators such as and/or operators, expansion operators, negation and/or any known or later developed method of describing a concept. The expansion of the element may be accomplished by consulting a thesaurus and/or ontologies such as WordNet and the like.

The first row contains the entry {Igor Domaradsky|Igor}. This entry describes how "Igor Domaradsky" is represented as either the full name "Igor Domaradsky" or by the first name "Igor".

The second row contains the entry +{disease*2}. This indicates that the concept described by the second element of the user interest information is associated with the term "disease". The "*" symbol indicates that the concept is described by WordNet synonyms, hyponyms and hypernyms within 2 links of "disease" in the WordNet lexicon. Thus, hyponyms such as viral and bacterial infections are included within one link. Specific diseases such as Ebola, plague, pneumonia and various others are captured within a second link. The "+" character preceding the term indicates the concept is to be added to the concepts of interest to the user. Similarly, a "−" character precedes concepts in which the user is dis-interested.

The third row contains the entry '+{bio-weapons*}'. This indicates that the concept described by the third element is associated with the term "bio-weapons" and the set of synonyms, hyponyms and hypernyms within a default value of 1 link of "bio-weapons" in the WordNet lexicon or ontology. It will be apparent that the Suggested Upper Merged Vocabulary (SUMO), Cyc and/or various lexicons and/or ontological hierarchies may also be used in the practice of this invention.

FIG. 10 is an exemplary packed structure 1700 according to an aspect of this invention. The exemplary packed structure 1700 reflects an encoding of the sentence of FIG. 9 into a packed f-structure of the Xerox Linguistic Environment. Two possible readings of the sentence are indicated by choices C1 1710 and C2 1720. The first choice illustrates the reading of the sentence in which "with" further qualifies the dish that Igor carried. In contrast, choice C2 1720 illustrates a reading of the sentence in which, Igor carrying the dish, is accompanied by the "culture of genetically altered plague".

The "Igor Domaradsky" and "plague" search terms are underlined within the exemplary packed structure 1700. The underlined elements represent the information of greatest interest to the user as indicated by the search terms. In one exemplary embodiment, user-interest information elements, such as the user-interest element "fortress" are marked for preferential retention in a later step. The elements of the packed structure that are underlined are preferentially retained and/or associated with a higher likelihood of retention. In one of the exemplary embodiments, user-interest information elements, such as the user-interest element "fortress" are marked for preferential retention in a later step. Elements that are not underlined can be suppressed and/or elided without unduly affecting the suitability of the passage for the user.

FIG. 11 is an exemplary reduced packed structure according to an aspect of this invention. The reduced structure of FIG. 11 is the result of applying condensation transformations to the full structure of FIG. 10. For clarity of discussion, only the reduced structure for the second choice C2 is illustrated in FIG. 11. The exemplary packed structure is encoded as a Xerox Linguistic Environment packed f-structure. The user interest information associated with the elements "Igor" and "plague" are underlined. The underline is associated with literal matches between elements in the packed structure and elements in the associated user interest information. The matched elements of the packed structure are user foci. However, it will be apparent that various matching strategies can be used to expand the scope of matching between elements of the user interest information and the elements of the packed structure.

Condensation transformations are applied to a packed structure. The resultant reduced packed structure conveys the meaning of the passage in a compact format targeted towards the user's specific interest and which is a good indication of the meaning of passage. For example, if the user had indicated an interest in "ancient" and "fortress", then the applied transformations would increase the likelihood that the terms "ancient" and "fortress" appear in the resultant packed structure. The optional meaning distortion constraints decrease the likelihood of a reduced packed structure that distorts the meaning of the passage. Thus, in various embodiments, condensates generated from the reduced packed structures and which are plausibly inferred, entailed and/or implied from the passage do not distort the meaning of the passage.

The elements D1 1810 and D2 1820 indicate two choices for the object of the verb "carry". Choice D1 1810 includes both the dish and the culture. However, by the application of the various exemplary condensation transformations, the phrase of the form "containers of X" is recognized and reduced to "X". This transformation gives rise to Choice D2 1820, in which only the culture is retained. This illustrates the effect of an exemplary condensation transformation that optionally deletes terms that denote "containers", motivated by the fact that the containers are possibly of less significance then the substance they contain.

FIG. 12 is a second exemplary reduced packed structure according to an aspect of this invention. FIG. 12 is a more compact version of the choice indicated by D1 in FIG. 11 in which the white space indicating the elided elements has been removed. In the reduced packed structure elements conceptually similar to user interest information elements are preserved and/or prioritized. The user interest information contained in the packed structure is retained while less salient information is removed.

For example, the information describing how the dish was taken through the gates, is removed. The elided information is less relevant to the user's explicitly stated interest in "Igor Domaradsky" and the "plague". The condensed output retains the interesting aspects of the passage's meaning. For example, the candidate condensate, "Igor Domaradsky carried a dish with a culture of plague through the gate" can be generated from the reduced packed structure. The 28 words of the passage have been reduced to the 13 user-interest focused words of the condensate.

The identification of user foci in the packed structure can be based on literal equivalence between elements in the user interest information and the elements of the packed structure. However, in various other exemplary embodiments, the user foci within the packed structure are related by concept matching. For example, the "*" symbol following the element "container" indicates a set of synonyms, hypernyms and hyponyms within 2 links of the word "container" in the WordNet lexicon. In still other exemplary embodiments, other lexicons such as the Suggested Upper Merged Ontology (SUMO), Cyc and the like are used, alone or in combination, to determine concepts expressed by the user interest information. In still other embodiments, the statistical similarity of elements can be used to determine the degree of match.

FIG. 13 is a second exemplary data structure for storing user interest information according to an aspect of this invention. The first row contains the entry {fortress*3}. This entry indicates how the concept of a "fortress" is represented by the specific term "fortress". The concept description also includes synonyms, hypernyms, and hyponyms that are within 3 links of the term "fortress" in the WordNet lexicon. It should be apparent that the practice of this invention is not limited to the use of the WordNet lexicon. Any known or later developed lexicon, ontology and/or system capable of representing concepts can be used, either alone or in combination, to represent the user interest information without departing from the scope of this invention.

The second row contains the entry {archaeology*}. This indicates that the user is interested in the term "archaeology" and all synonyms, hypernyms and hyponyms within a default "1" link of the term in the WordNet lexicon.

The third row contains the entry {bronze age*}. This entry indicates that the user is interested in the concept of the "bronze age". The concept is defined by the term "bronze age" and all synonyms, hypernyms and hyponyms within a default value of 1 link of the term in the WordNet lexicon.

The fourth contains the entry "c:\user_a\file_history". This indicates that the concepts defining the user's interest in history should be read from the file accessible at "c:\user_a\file_history".

The fifth row contains the entry "c:\user_a\file_project1". This indicates the filename from which concept terms describing the user interest information associated with project1 should be read. Project1 refers to a collaborative project. The concept terms specified in the file include terms that are incrementally learned and/or otherwise adjusted by the project team members. The encapsulation of the concept terms within a single file allows team members to quickly share group knowledge with other persons.

The sixth row contains the entry –{container*2}. The "–" sign indicates a term in which the user has expressed disinterest. The term and related concepts are therefore excluded from the concepts of interest to the user. This indicates that synonyms, hypernyms and hyponyms within 2 links of "container" are excluded or down-weighted from the concepts of interest to the user. For example, the choice D1 of FIG. 11 would be suppressed and only the reduced meaning indicated by choice D2 would be created.

The seventh row contains the value "Named_Entity.Person*". This indicates that named entities of the type person, are of interest to the user. In various embodiments, the named entities can be identified by various known or later developed named entity recognizers.

In one of the various exemplary embodiments, the values of each row in the data structure for storing user interest information are joined together by an implicit logical 'OR' operation. However, various types of implied and/or explicit logical connectives may be used without departing from the scope of this invention.

In an exemplary embodiment in which the condensate is displayed to the user, different sets of user interest information are associated with different tags, display characteristics and the like. For example, user foci associated with the elements contained in the file "file_project1" are displayed using a "project1" tag, a red color display characteristic and the like. In contrast, the user foci associated with the elements contained in the "file_history" user information are associated with a "history" tag, a yellow display characteristic and the like.

The user foci that are similar to the user interest elements are displayed in a bold font characteristic. The less similar elements are displayed in italics and/or any known or later identified human sensible display characteristic. This allows the user to quickly understand how closely the condensed text is related to a concept of interest. The display characteristics include, but are not limited to, color, font, italics, bolding, sound, touch and/or any known or later developed human sensible characteristic.

FIG. 14 is an exemplary data structure for storing meaning distortion constraints 2100 according to an aspect of this invention. The data structure for storing meaning distortion constraints is comprised of a pattern portion 2110 and an action portion 2120. The pattern portion 2110 contains constraints that are matched before the associated action rule is activated.

The first row of the exemplary data structure for storing meaning distortion constraints 2100 contains the value "–DOWNWARD_MONOTONIC (P)" in the pattern portion 2110. The preceding "–" character indicates negation. Thus, this pattern constraint is matched if the predicate "P" is not downward monotonic. In various exemplary embodiments, the downward monotonicity characteristic of a text predicate is determined based on functions within the Xerox Linguistic Environment (XLE), a lookup operation on an ontology and/or lexicon, and/or by using any now or later developed method of determining downward monotonicity.

The action portion 2120 of the exemplary data structure for meaning distortion constraints 2100 contains the rewrite rule "CONDENSE_MODIFIERS (P)". The rewrite rule is activated if the constraints in the pattern portion 2110 are satisfied. The rewrite rule contained in the action portion 2120 condenses modifiers if the predicate is not downward monotonic. That is, the modifiers in the passage are condensed only if the meaning of the passage would not be modified by the condensation.

For example, an exemplary lexicon may encode information that the word "prevent" is downward monotonic and the word "cause" is not. Thus, the presence of the word "prevent" in the phrase "the president prevented a long strike" indicates the phrase is downward monotonic. Thus, the phrase cannot satisfy the pattern portion 2110 of the meaning distortion constraint. The associated rewrite rule in the action portion 2120 is not activated to condense the modifiers in the sentence. Thus, meaning distorting condensates such as "the president prevented a strike", where the modifier "long" has been deleted, are less likely to be generated. On the other hand, the likelihood of condensing "the president caused a long strike" to "the president caused a strike" will not be decreased.

The second row contains the value "PASSIVE(P), SUBJ (P,S), BY-OBJ(P,O)" in the pattern portion 2110. This indicates that the associated action rule of the action portion 2120 is activated if some predicate P is passive, has a subject S and a BY preposition phrase with object O.

The action portion 2120 contains the value "SUBJ(P,O), OBJ(P,S)". This indicates that if the constraints of the associated pattern portion 2110 are satisfied, the passive mark is removed making the sentence active, the BY(O) object is made the subject and the original subject S is made the object. Thus, for example, the phrase "John was seen by Bill" is condensed to "Bill saw John". The effect of the condensation transformation is to change the phrase "was seen" to the phrase "saw" and to switch the subject and object in the sentence to avoid meaning distortion of the passage.

The third row contains the value "FACTIVE(P,C)" in the pattern portion 2110. This indicates that the value in the action rule portion 2120 is triggered to apply to the complement of some factive predicate P. The action portion 2120 contains the value "EXTRACT-COMPLEMENT(P,C)" indicating the action performed when the value in the pattern portion 2110 is matched. Factive predicates are further discussed in "Fact" by P. Kiparsky and C. Kiparsky in "M. Bierwisch and K. E. Heidolph (eds.), Progress in Linguistics, pp. 143-173, The Hague: Mouton 1970, herein incorporated by reference in its entirety.

The fourth row contains the value "POLARITY_PRESERVE(P,C)" in the pattern portion 2110 and "EXTRACT-COMPLEMENT(P,C) in the action portion 2120. This indicates that the re-write rule "EXTRACT-COMPLEMENT(P, C) is triggered when the word is a polarity preserving word such as "manage".

The Nth row contains the value "POLARITY_REVERSE (P,C)" in the action portion 2110 and "EXTRACT-COMPLEMENT(P,C) NEGATE(C) in the action portion 2120. This indicates that the re-write rule "EXTRACT-COMPLEMENT (P,C) NEGATE(C) is triggered when the word is a polarity reversing word such as "fail".

For example, the sentence, "The administration failed to track down the terrorists" can be re-written as "The administration did not track down the terrorists." The word "not" must be added when the complement is extracted to preserve entailment since the word "failed" is a polarity reversing term. In contrast is the sentence "the administration managed to track down the terrorists". The word "manage" is polarity preserving. Thus, the phrase "The administration tracked down the terrorists" is entailed and is an acceptable condensate.

FIG. 15 is a first exemplary data structure for storing document passages 2200 according to an aspect of this invention. The first exemplary data structure for storing document passages is comprised of an id portion 2210 and a passage portion 2220.

The id portion 2210 contains a value that identifies the document to the system for constructing user-interest sensitive indicators of search results 100. In various exemplary embodiments, the value in the id portion 2210 is based on the link, uniform resource locator, and/or other addressing mechanism for the document.

The passage portion 2220 reflects the passages of the document identified by the associated document identifier 2210. In one exemplary embodiment, relevant document passages are sentences in a search document containing the search terms. The id for the document and each relevant passage of the document are saved in the data structure for storing document passages 2200.

FIG. 16 is a table showing conventional search result summaries 2300. The first row contains an indicator " . . . " of eliding text. The summary contains the search terms "Igor Domaradsky" and "plague". but it does not contain complete sentences that are easy to read. However, the extraction process used to generate the summary elides the phrase "Soviet Bioweapons". The extractive summary therefore fails to provide a user-interest focused signal of the meaning of the passage that incorporates the user's interest in bio-weapons.

FIG. 17 shows an exemplary data structure for storing user-interest sensitive indicators of search results 2400 according to this invention. The exemplary data structure for storing user-interest sensitive indicators of search results 2400 is comprised of an id portion 2410 and a condensate portion 2420.

The id portion 2410 identifies the document within the system for constructing user-interest sensitive indicators of search results. The value in the id portion 2410 includes a uniform resource locator and/or any known or later developed address useful in identifying the document to the system for constructing user-interest sensitive search result indicators.

The condensate portion 2420 contains a user-interest sensitive condensation of the relevant passage. The condensate preferentially retains words and/or concepts of interest to the user. In one exemplary embodiment according to this invention, the search terms are combined with the user interest information in a priority union. The elements of the priority union are used to prioritize the retention of passage elements during condensation. The resultant condensate provides a user-interest focused signal of the meaning of the passage.

FIG. 18 is an exemplary user-interest sensitive search result 2500 according to an aspect of this invention. The user-interest sensitive search result indicator 2500 is comprised of an optional title portion 2510; a condensate portion 2520; and an optional link portion 2530.

The optional title portion 2510 contains the document title. In various embodiments, the document title is determined based on hypertext markup language tags, extendible markup language tags or labels within the document. In still other embodiments according to this invention, the optional title portion 2510 is programmatically generated.

The condensate portion 2520 contains a user-interest sensitive condensate that signals the user-interest focused meaning of the document passage. Thus, although the phrase "was researching the Soviet Bioweapons program" does not contain a search term, the phrase is included in the condensation because it corresponds to the user's interest in bio-weapons.

FIG. 19 is a second view of the exemplary user-interest sensitive indicator of search result 2600, according to an aspect of this invention. The view of the user-interest sensitive indicator of search results 2600 is comprised of a an optional title portion 2610; an expanded passage 2620; and an optional link portion 2630. The search terms 2640-2641 are indicated in bold.

The optional title portion 2610 contains the vale "Breeding the Plague" indicating an extracted and/or programmatically generated title for the expanded passage portion 2620. The value in the expanded passage portion 2620 is the passage selected from the document. The value "www.themoscotimes.com/stories/2004/10/22/110.html" in the optional link portion 2630 provides a link to document.

The expansion of the passage shows the original passage from which the condensation was determined and may be included with the indicator to provide a signal with more context of the meaning of the search result. The expansion may be triggered by moving a pointing device over the condensed portion of the indicator. The pointing device includes but is not limited to a mouse, an eye tracking device, a touch sensitive screen and the like. Display attributes such as font selection, font size, color, italics and the like are used to show how the degree of similarity between indicator elements and elements of the user-interest information.

For example, the font size of elements and/or words in the indicator that match user-interest elements may be adjusted based on the degree of similarity. Thus, in one example, the font size is adjusted by 1 point size for each WordNet link between the elements or words. It will be apparent that the search indicator, including the link, the condensate and any associated passage may be inserted as user-interest sensitive notes into the user's note-file, as further described in "Systems and Methods for User-Interest Sensitive Note-Taking", co-pending U.S. patent application Ser. No. 10/999,793, by R. KAPLAN et al., filed Nov. 30, 2004.

FIG. 20 shows a tabular structure. The structure contains birth, death, marriage and divorce statistics over various years. The tabular structure returned by the search includes 100 columns by 4 rows of information. The search system or service selected the entire structure based on a search for the "marriage" term. The large number of rows and columns makes it difficult to find information relevant to the user's task in the tabular structure.

FIG. 21 shows an exemplary user-interest sensitive indicator of tabular search results 2800 according to an aspect of this invention. The large source table of 100 columns by 4 rows is reduced to a 2 row by 2 column user-interest sensitive indicator of tabular search results 2800. The condensation transformations exploit an understanding of the grammar of the source table structure. Thus, the system for constructing user-interest sensitive indicator of search results determines a user-interest sensitive indicator based on the "marriages" search term and previously expressed interest in the "1950", "1960" and "births" user-interest information elements. The tabular user interest sensitive indicator of search results signals the user-interest sensitive meaning of the tabular meaning structure.

FIG. 22 shows an exemplary user-interest sensitive indicator of image search results. An image 2910 is selected as a passage for a document in a set of documents found by search.

The user-interest in the image 2920 is indicated by the image-based user-interest sensitive indicator of search results 2920. The image 2910 was one of various images found by a search for the term "house". Various well known image focused condensation transformations are applied to the image based on the search term "house" and a user interest element "pond". The identified elements in the passage that match the search and user interest elements are used to form a user-interest sensitive indicator of search results. The resultant image-based user-interest sensitive indicator of search results 2920 provides a user-interest focused signal of the meaning of the image. An icon or reduced image containing these elements is displayed to the user. In other exemplary embodiments, a textual description of the matched elements is used to construct a user interest sensitive indicator of image based documents search results.

In the various embodiments of the system for constructing user-interest indicators of search results 1000, each of the circuits 100-800 outlined above can be implemented as portions of a suitably programmed general-purpose computer. Alternatively, 100-800 of the system for constructing user-interest indicators of search results 1000 outlined above can be implemented as physically distinct hardware circuits within an ASIC, or using a FPGA, a PDL, a PLA or a PAL, or using discrete logic elements or discrete circuit elements. The particular form each of the circuits 100-800 of the system for constructing user-interest indicators of search results 1000 outlined above will take is a design choice and will be obvious and predictable to those skilled in the art. In various embodiments according to this invention, the system for constructing user-interest sensitive indicators of search results 1000 may be embedded within a personal computer, a digital jukebox, a personal digital assistant and/or any other device. Moreover the system for constructing user-interest sensitive indicators of search results 1000 may be used with local or desktop file systems and/or communications enabled information repositories without departing from the spirit or scope of this invention.

Moreover, the system for constructing user-interest sensitive indicators of search results 1000 and/or each of the various circuits discussed above can each be implemented as software routines, managers or objects executing on a programmed general purpose computer, a special purpose computer, a microprocessor or the like. In this case, the system for constructing user-interest sensitive indicators of search results 1000 and/or each of the various circuits discussed above can each be implemented as one or more routines embedded in the communications network, as a resource residing on a server, or the like. The system for constructing user-interest indicators of search results 1000 and the various circuits discussed above can also be implemented by physically incorporating the system for constructing user-interest indicators of search results 1000 into software and/or hardware system, such as the hardware and software systems of a web server or a client device.

As shown in FIGS. 3, 5 and 7, memory 200 and 615 and user-interest memory 630 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1, 3, 5 and 7 can each be any known or later developed device or system for connecting a communication device to the system for constructing user-interest indicators of search results 1000, including a direct cable connection, a connection over a wide area network or a local area network, a connection over an intranet, a connection over the Internet, a connection within a computer over an internal bus, and/or a connection over any distributed processing network or system. In general, the communication links 99 can be any known or later developed connection system or structure usable to connect devices and facilitate communication.

Further, it should be appreciated that the communication links 99 can be a wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of constructing user-interest sensitive search result indicators comprising the steps of:
    entering search terms;
    determining user interest information;
    performing a query of a database based on at least the search terms;
    selecting a set consisting of at least one document based on the search terms;
    determining passages from each document in the set of at least one document based on the search terms and the user interest information;
    determining condensation transformations by reducing at least some of the determined passages by merging, deleting and/or changing elements of the passages, and further including prioritizing the retention of the elements of the passage that match elements of the user interest information; and
    constructing user-sensitive search result indicators for each passage of the at least one document, based on the search terms, the user interest information and the condensation transformations.

2. The method of claim 1, further comprising:
    determining passages containing non-local references;
    determining additional passages associated with the non-local references;
    determining augmented passages based on the additional passages and the passages;
    determining search result indicators for each passage and augmented passage, based on the search terms, the user interest information and the condensation transformations.

3. The method of claim 1, in which the matches are determined based on at least one of: literal, conceptual, distributional, statistical, and co-occurrence similarity.

4. The method of claim 3, in which the conceptual similarity is based on at least one of: a lexicon; an ontology; statistics and a machine-readable information source.

5. The method of claim 1, in which the condensation transformations are applied to the meaning structures based on meaning distortion constraints.

6. The method of claim 5, in which the meaning distortion constraints are useable to adjust the condensation of meaning structures characterized as at least one of: downward monotonic and factive.

7. The method of claim 1 in which elements of user interest information are based on a named entity recognizer.

8. The method of claim 1, in which the matches are determined based on a named entity recognizer.

9. The method of claim 1, in which the passages are at least one of: textual, image, and sound information.

10. The method of claim 9, in which the textual information is tabular information.

11. The method of claim 10, further comprising the steps of:
determining a meaning structure for the passage by parsing the structure of the tabular information; and
determining the condensation based on elements of the meaning structure that match elements of the user interest information.

12. The method of claim 10, where the condensation transformations extract rows and columns from the tabular information based on the user interest information.

13. The method of claim 1, in which the search result indicators are grammatical.

14. A method of constructing user-interest sensitive search result indicators comprising the steps of:
entering search terms;
determining user interest information;
performing a query of a database based on at least the search terms;
selecting a set of at least one document based on the search terms;
determining passages from each document in the set of at least one document based on the search terms and the user interest information;
determining a meaning structure for the passages;
determining condensation transformations by reducing at least some of the determined passages by merging, deleting and/or changing elements of the passages, and further including determining the condensation based on elements of the meaning structure that match elements of the user interest information; and
constructing user-sensitive search result indicators for each passage of the at least one document, based on the search terms, the user interest information and the condensation transformations.

15. The method of claim 14, in which the meaning structure is determined based on a parsing grammar.

16. The method of claim 14, in which the meaning structure is a packed meaning structure.

17. The method of claim 16, in which the packed meaning structure is at least one of: a logical formula in the predicate calculus, a minimal recursion semantic structure of head-driven phrase-structure grammar, a feature structure of a head-driven phrase-structure grammar and an f-structure of lexical functional grammar.

18. A method of constructing user-interest sensitive search result indicators comprising the steps of:
entering search terms;
determining user interest information;
performing a query of a database based on at least the search terms;
selecting a set of at least one document based on the search terms;
determining passages from each document in the set of at least one document based on the search terms and the user interest information;
determining condensation transformations by reducing at least some of the determined passages by merging, deleting and/or changing elements of the passages, wherein, the condensation transformations are applied to meaning structures based on meaning distortion constraints; and
constructing user-sensitive search result indicators for each passage of the at least one document, based on the search terms, the user interest information and the condensation transformations.

19. A system for constructing user-interest sensitive search result indicators comprising:
an input/output circuit for entering search terms; and
a processor that,
retrieves user interest information from a memory
performs a query of a database based on at least the search term
selects a set of at least one document based on the search terms
determines passages from each document in the set of at least one document based on the search terms and the user interest information
determines condensation transformations by reducing at least some of the determined passages by merging, deleting and/or changing elements of the passages and
constructs search result indicators for each passage of the at least one document, based on the search terms, the user interest information and the condensation transformations, and wherein the condensation transformation determined by the processor prioritizes retention of elements of the passage that match elements of the user interest information.

20. The system of claim 19, in which the processor determines matches based on at least one of: literal, conceptual, distributional, statistical, and co-occurrence similarity.

21. The system of claim 20, in which the conceptual similarity is based on at least one of: a lexicon; an ontology; statistics and a machine-readable information source.

22. The system of claim 19, in which the processor applies the condensation transformations to the meaning structures based on meaning distortion constraints.

23. The system of claim 22, in which the meaning distortion constraints are useable to adjust the condensation of meaning structures characterized as at least one of: downward monotonic and factive.

24. The system of claim 19, in which elements of user interest information are based on a named entity recognizer.

25. The system of claim 19, in which the matches are determined based on a named entity recognizer.

26. A system for constructing user-interest sensitive search result indicators comprising:
an input/output circuit for entering search terms; and
a processor that,
retrieves user interest information from a memory
performs a query of a database based on at least the search terms
selects a set of at least one document based on the search terms
determines passages from each document in the set of at least one document based on the search terms and the user interest information
determines condensation transformation by reducing at least some of the determined passage by merging, deleting and/or changing elements of the passages
constructs search result indicators for each passage of the at least one document, based on the search terms, the user interest information and the condensation transformations, and wherein the processor determines a meaning structure for the passages and further determines the condensation based on elements of the meaning structure that match elements of the user interest information.

27. The system of claim 26, in which the processor determines the meaning structure based on a parsing grammar.

28. The system of claim 26, in which the meaning structure is a packed meaning structure.

29. The system of claim 28, in which the packed meaning structure is at least one of: a logical formula in the predicate calculus, a minimal recursion semantic structure of a head-driven phrase-structure grammar, a feature structure of a head-driven phrase-structure grammar and an f-structure of lexical functional grammar.

30. Computer readable storage medium comprising:
computer readable program code embodied on the computer readable storage medium, the computer readable program code usable to program a computer for constructing user-interest sensitive search result indicators comprising the steps of:
entering search terms;
determining user interest information;
performing a query of a database based on at least the search terms;
selecting a set of at least one document based on the search terms;
determining passages from each document in the set of at least one documents based on the search terms and the user interest information;
determining condensation transformations, by reducing at least some of the determined passages by merging deleting and/or changing elements of the passages and further including prioritizing the retention of the elements of the passage that match elements of the user interest information; and
constructing user-sensitive search result indicators for each passage of the at least one document, based on the search terms, the user interest information and the condensation transformations.

* * * * *